United States Patent [19]
Blum et al.

[11] Patent Number: 5,918,223
[45] Date of Patent: Jun. 29, 1999

[54] METHOD AND ARTICLE OF MANUFACTURE FOR CONTENT-BASED ANALYSIS, STORAGE, RETRIEVAL, AND SEGMENTATION OF AUDIO INFORMATION

[75] Inventors: Thomas L. Blum, San Francisco; Douglas F. Keislar, Berkeley; James A. Wheaton, Fairfax; Erling H. Wold, El Cerrito, all of Calif.

[73] Assignee: Muscle Fish, Berkeley, Calif.

[21] Appl. No.: 08/897,662

[22] Filed: Jul. 21, 1997

Related U.S. Application Data

[63] Continuation-in-part of application No. 08/681,174, Jul. 19, 1996.

[51] Int. Cl.$^6$ .................................................. G06F 17/30
[52] U.S. Cl. ............................................. 707/1; 707/104
[58] Field of Search ......................... 707/1, 104; 345/302

[56] References Cited

U.S. PATENT DOCUMENTS

| | | | |
|---|---|---|---|
| 5,283,819 | 2/1994 | Glick et al. ......................... | 379/93.01 |
| 5,437,050 | 7/1995 | Lamb et al. ................................ | 455/2 |
| 5,692,213 | 11/1997 | Goldberg et al. ...................... | 345/302 |
| 5,701,452 | 12/1997 | Siefert ....................................... | 707/1 |
| 5,724,605 | 3/1998 | Wissner .................................. | 345/302 |

OTHER PUBLICATIONS

Foote, J., "A Similarity Measure for Automatic Audio Classification," Institute of Systems Science, National University of Singapore, 1977, Singapore.

Scheirer, E., Slaney, M., "*Construction and Evaluation of a Robust Multifeature Speech/Music Discriminator,*" pp. 1–4, Proceedings of ICASSP–97, Apr. 2–24, Munich, Germany.

Scheirer, E.D., "*Tempo and Beat Analysis of Acoustic Musical Signals,*" Machine Listening Group, E15–401D MIT Media Laboratory, pp. 1–21, Aug. 8, 1997, Cambridge, MA.

Wold, E., Blum, T., Keislar, D., and Wheaton, J., "*Content–Based Classification, Search, and Rerieval of Audio,*" IEEE Multimedia Magazine, Fall 1996.

Blum, T., Keislar, D., Wheaton, J., and Wold, E., "*Audio Databases with Content–Based Retrieval,*" Prodeedings of the 1995 International Joint Conference on Artificial Intelligence (IJCAI) Workshop on Intelligent Multimedia Information Retrieval, 1995.

Keislar, D., Blum, T., Wheaton, J., and Wold, E., "*Audio Analysis for Content–Based Retrieval*" Proceedings of the 1995 International Computer Music Conference, No date.

Feiten, B. and Gunzel, S., "*Automatic Indexing of a Sound Database Using Self–Organizing Neural Nets,*" Computer Music Journal, 18:3, pp. 53–65, Fall 1994.

Vertegaal, R. and Bonis, E., "*ISEE: An Intuitive Sound Editing Environment,*" Computer Music Journal, 18:2, pp. 21–22, Summer 1994, (List continued on next page.)

*Primary Examiner*—Wayne Amsbury
*Assistant Examiner*—Cheryl Lewis
*Attorney, Agent, or Firm*—Willis E. Higgins; Richard M. Goldman; Cooley Godward LLP

[57] ABSTRACT

A system that performs analysis and comparison of audio data files based upon the content of the data files is presented. The analysis of the audio data produces a set of numeric values (a feature vector) that can be used to classify and rank the similarity between individual audio files typically stored in a multimedia database or on the World Wide Web. The analysis also facilitates the description of user-defined classes of audio files, based on an analysis of a set of audio files that are members of a user-defined class. The system can find sounds within a longer sound, allowing an audio recording to be automatically segmented into a series of shorter audio segments.

20 Claims, 21 Drawing Sheets

Overview of Feature Vector Computations

OTHER PUBLICATIONS

Cosi, P., De Poli, G., Prandoni, P., "*Timbre Characterization with Mel–Cepstrum and Neural Nets,*" Proceedings of the 1994 International Computer Music Conference, pp. 42–45, San Francisco, No date.

Gonzalez, R. and Melih, K., "*Content Based Retrieval of Audio,*" The Institute for Telecommunication Research, University of Wollongong, Australia, No date.

Fischer, S., Lienhart, R., and Effelsberg, W., "*Automatic Recognition of Film Genres,*" Reihe Informatik, Jun. 1995, Universitat Mannheim, Praktische Informatik IV, L15, 16, D–68131 Mannheim.

Ken C. Pohlmann, "Principles of Digital Audio", SAMS/A Division of Prentice Hall Computer Publishing, no date.

Typical Hardware Environment

Prepare File for Reading

FIG. 3  Overview of Feature Vector Computations

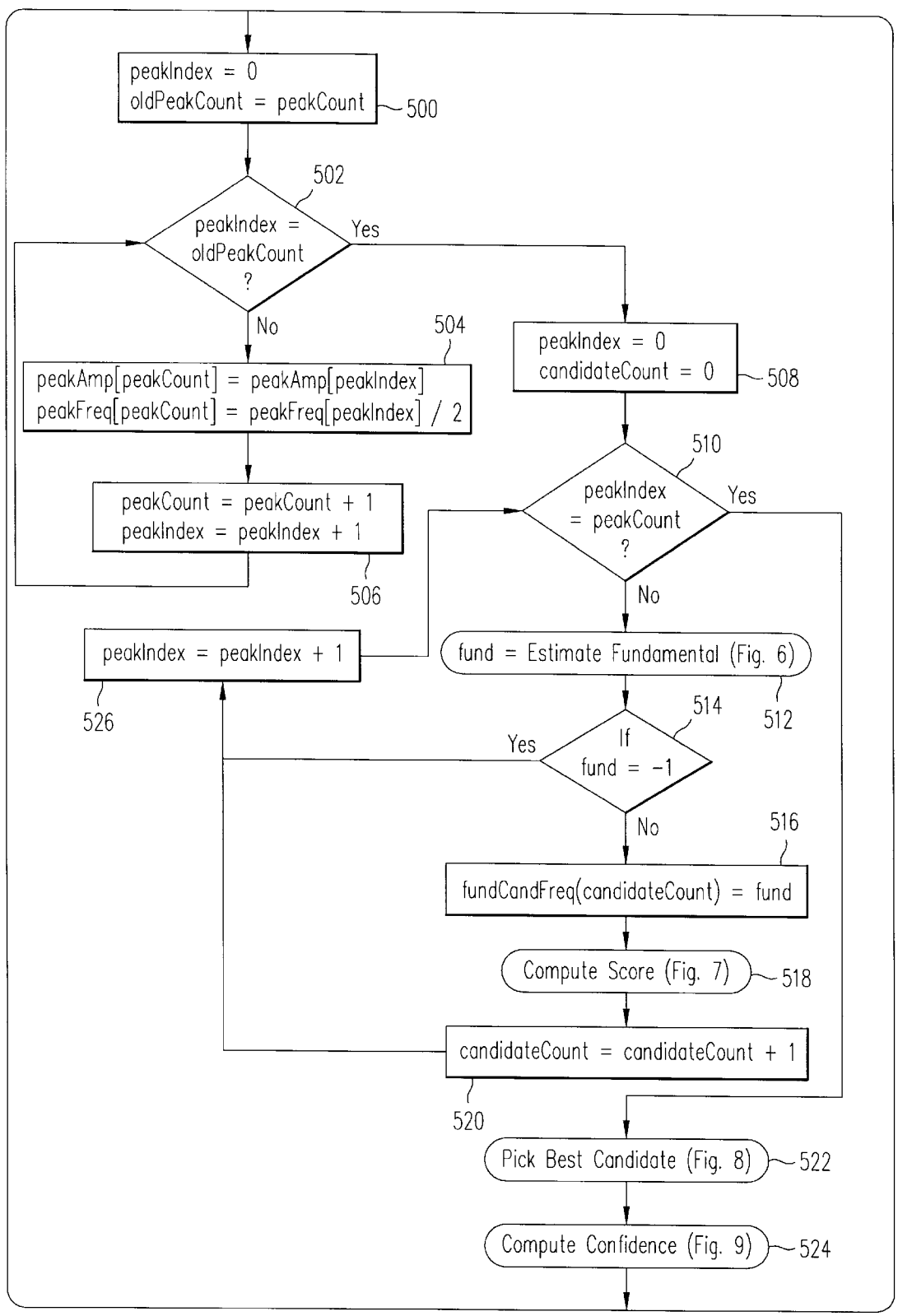
FIG. 5  Pitch-Estimate

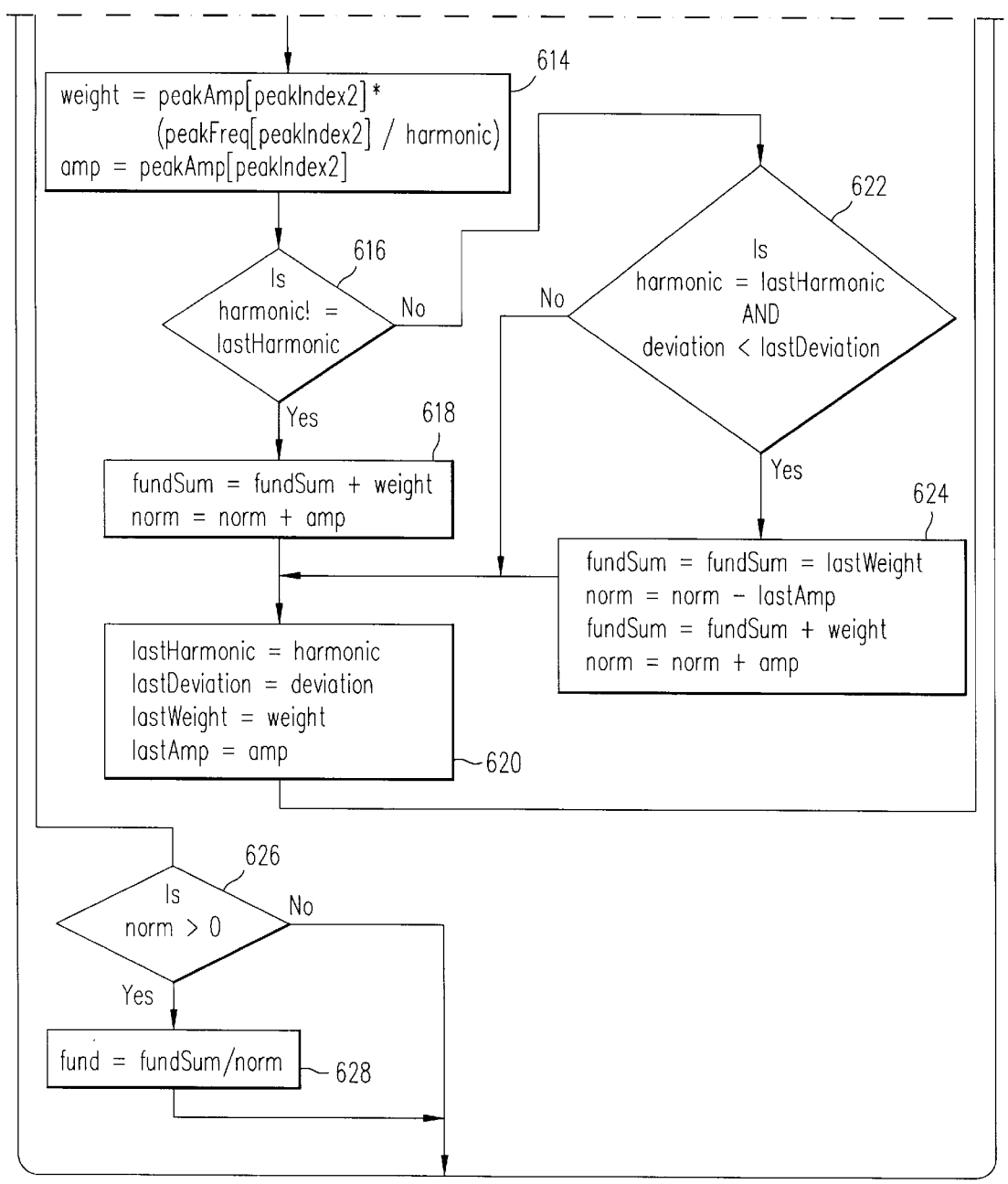
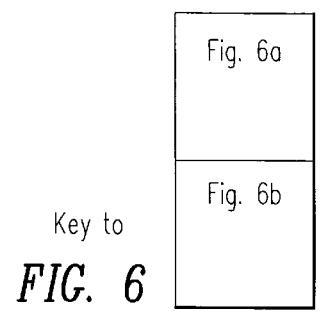
FIG. 6b  Estimate Fundamental
Key to
FIG. 6

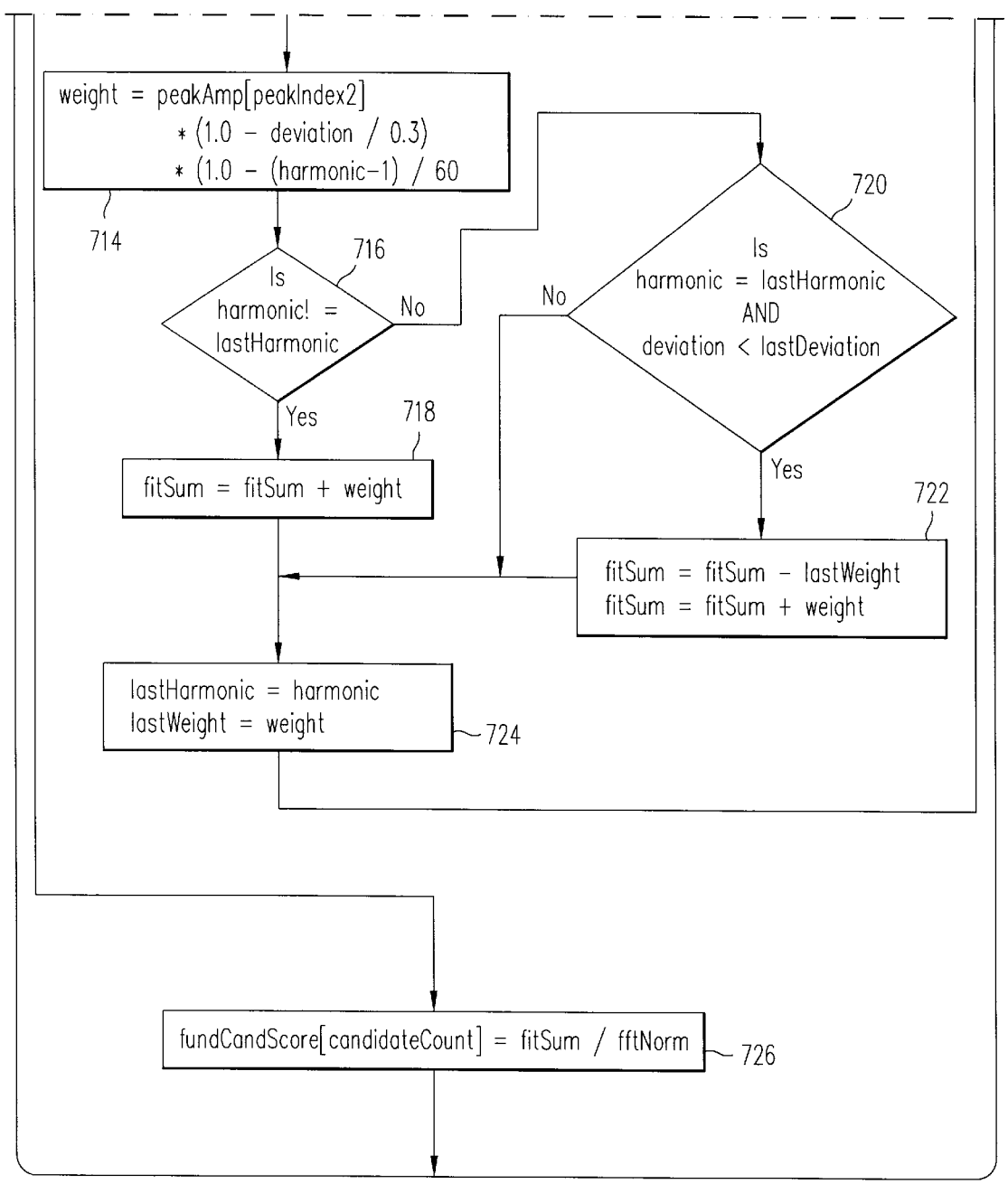
FIG. 7b   Compute Score

Pick Best Candidate

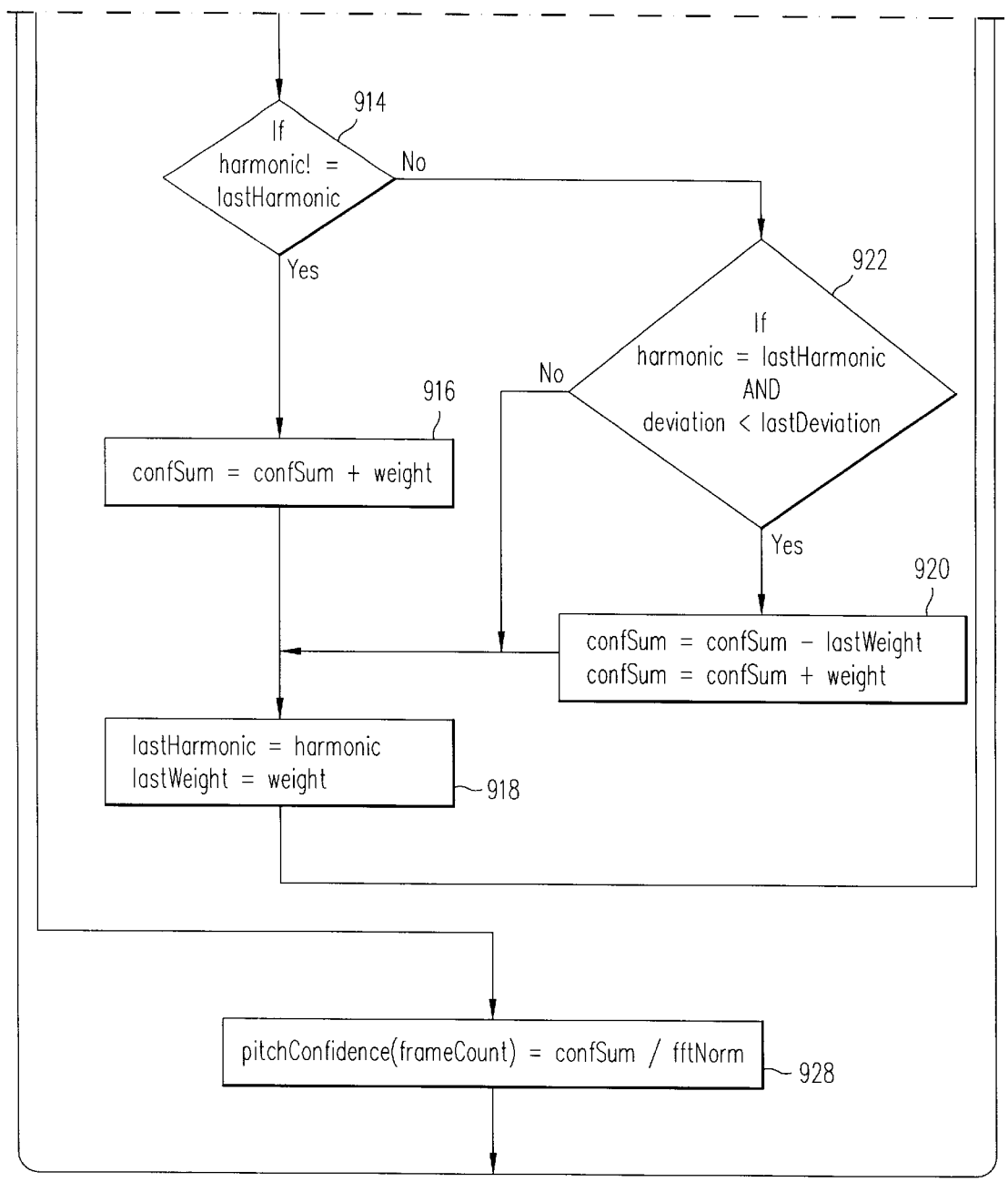
FIG. 9b  Compute Confidence

Brightness Computation

Bandwidth Computation

MFCC Computation

Statistics Computation

Find the Peak of the Rhythm Spectrum

Compute the Rhythm Trajectory

Comparing Sounds by Matching Trajectories

Computing the Distance
Between two Rhythm Trajectories

METHOD AND ARTICLE OF MANUFACTURE FOR CONTENT-BASED ANALYSIS, STORAGE, RETRIEVAL, AND SEGMENTATION OF AUDIO INFORMATION

CROSS-REFERENCE TO RELATED APPLICATION

This application is a continuation-in-part of U.S. Ser. No. 08/681,174, filed Jul. 19, 1996, pending which disclosures are herein incorporated by reference.

FIELD OF INVENTION

This invention generally relates to improvements in multimedia database applications and Internet search engines, and more particularly to providing a means for finding audio data files (or segments of digital audio) that sound similar to given sounds, or that sound similar to predefined classes of sounds.

BACKGROUND OF THE INVENTION

The rapid increase in speed and capacity of computers and networks has allowed the inclusion of audio as a data type in many modem computer applications. However, the audio is usually treated as an opaque collection of bytes with only the most primitive database fields attached: name, file format, sampling rate and so on. Users who are accustomed to searching, scanning and retrieving text data can be frustrated by the inability to look inside the audio objects.

For example, multimedia databases or file systems can easily have thousands of audio recordings. These could be anything from a library of sound effects to the soundtrack portion of an archive of news footage. Such libraries often are poorly indexed or named to begin with. Even if a previous user has assigned keywords or indices to the data, these are often highly subjective and may be useless to another person. To search for a particular sound or class of sound (e.g., applause or music or the speech of a particular speaker) can be a daunting task.

As an even more ubiquitous example, consider Internet search engines, which index millions of files on the World Wide Web. Existing search engines index sounds on the Web in a simplistic manner, based only on the words in the surrounding text on the Web page, or in some cases also based on the primitive fields mentioned above (soundfile name, format, etc.). There is a need for searching based on the content of the sounds themselves.

Database applications and Web search engines typically deal with files, whether on a local filesystem or distributed over the Internet. However, there is also a need for content-based retrieval of audio in applications where the sounds are not separate files or database records, but rather individual events in a longer, continuous stream of sound. This stream of sound might be a real-time input to a computer system, as from a microphone or from audio "streamed" over the Internet. It might also be a recording, such as the digitized soundtrack of a video recording, that needs to have its individual events identified and extracted (not necessarily in realtime). For example, one might want to identify key frames in a video of a sporting event by searching the soundtrack for applause and cheers.

Sounds are traditionally described by their pitch, loudness, duration, and timbre. The first three of these psychological precepts are well-understood and can be accurately modeled by measurable acoustic features. Timbre, on the other hand, is an ill-defined attribute that encompasses all the distinctive qualities of a sound other than its pitch, loudness, and duration. The effort to discover the components of timbre underlies much of the previous psychoacoustic research that is relevant to content-based audio retrieval.

Salient components of timbre include the amplitude envelope, harmonicity, and spectral envelope. The attack portions of a tone are often essential for identifying the timbre. Timbres with similar spectral energy distributions (as measured by the centroid of the spectrum) tend to be judged as perceptually similar. However, research has shown that the time-varying spectrum of a single musical instrument tone cannot generally be treated as a "fingerprint" identifying the instrument, because there is too much variation across the instrument's range of pitches, and across its range of dynamic levels. Various researchers have discussed or prototyped algorithms capable of extracting audio structure from a sound. The goal was to allow queries such as "find the first occurrence of the note G-sharp." These algorithms were tuned to specific musical constructs and were not appropriate for all sounds.

There has been work done on the indexing of audio databases using neural nets. Although they had some success with their method, it has several problems from our point of view. One, while the neural nets report similarities between sounds, it is very hard to "look inside" the net after it is trained or while it is in operation to determine how well the training worked or what aspects of the sounds are similar to each other.

It is difficult for the user to specify which features of the sound are important and which to ignore.

Considerable work has been done in the arena of speaker identification. This task requires comparison of speech sounds, with the goal of retrieving sounds that are similar to given recordings of a particular person speaking. However, most of the research and development in this area has been tailored specifically for speech sounds. A more general approach capable of comparing all sorts of sounds is needed.

SUMMARY OF THE INVENTION

This invention is composed of two basic components, typically implemented as software running on a digital computer. The two components are the analysis of sounds (digital audio data), and the retrieval of these sounds based upon statistical or frame-by-frame comparisons of the analysis results.

Frequently, the items to be analyzed are discrete sound files, but, as mentioned earlier, they might instead be individual segments of a longer file, or of a real-time stream of digital audio. For simplicity, we use the term "sound file" to cover all these cases. Those skilled in the art will recognize that operations on an entire file can also be performed upon a particular part of the file or upon a streamed input. Similarly, we use the term "database" in a general sense to refer to any indexed collection of data. This might be the product of a traditional database application, but could equally well be the index created by a Web search engine, or any analogous index.

The invention first measures a variety of acoustical features of each sound file. The choice of which acoustical features to measure is critical to the success of the invention. The invention measures the loudness, bass, pitch, brightness, bandwidth, and Mel-frequency cepstral coefficients (MFCCs) at periodic intervals (referred to as "frames") over the length of the sound file. The per-frame values are optionally stored, for applications that require that level of detail. Next, the per-frame first derivative of each of these features is computed. Then the invention computes specific statistical measurements, namely, the mean and standard deviation, of each of these features, including the first derivatives, to describe their variation over time. This set of statistical measurements is represented as an N-vector (a vector with N elements), also known as a "feature vector." For musical applications, an additional, separate Arhythm feature vector@ can be created.

Once the feature vector of the sound file has been stored in a database with a corresponding link to the original data file, the database can be queried by the user in order to access the corresponding sound files. The database system must be able to measure the distance in N-space between two N-vectors. We provide several methods for performing such a measurement.

The user can create "classes" of sounds (e.g. "bird sounds", "rock music", etc.) by specifying a set of sound files that belong to this class. The average N-vector of these sound files will represent this sound class in N-space.

This invention allows users to search the sound file database by four specific methods, enumerated below. The result of these searches is a list of sound files rank-ordered by distance from the specified N-vector, which corresponds to sound-files which are most similar to the specified N-vector.

1) Simile: asking for sounds which are similar to an example sound file, or a list of example sound files.

2) Acoustical/perceptual features: asking for sounds in terms of commonly understood physical characteristics, such as brightness, pitch and loudness.

3) Subjective features: asking for sounds using individually defined classes. For example, a user might be looking for a sound which is both "shimmering" and "rough", where the classes "shimmering" and "rough" have been previously defined by a set of appropriate examples.

4) Onomatopoeia: producing a sound similar in some quality to the sound you are looking for. For example, the user could produce a buzzing sound into a microphone in order to find sounds like bees or electrical hum.

In a database retrieval application, all of the above could be used in combination with traditional keyword and text queries. That is, a user could ask for the top 20 sound files with the keyword "Project 1" that are similar to the sound found in the file "datafile 1".

The invention also provides an alternative method for classifying sounds, in which the classification is formed using a probability density function based on the analysis frames themselves, rather than using the feature vectors' statistical measurements.

In addition to allowing a user to retrieve a certain sort of sound, and to classify a set of sounds into classes, the invention allows a user to automatically divide a recording or stream of audio into individual segments. There are several ways in which the stream can be segmented. The user can provide a sound that is believed to be be present in the stream, and ask the system to mark the points at which this exact sound occurs. Alternatively, the user can ask for the points at which any sound similar to the given sound occurs. Finally, the user can ask the system to locate "scene changes": points at which successive sounds are sufficiently dissimilar from each other.

BRIEF DESCRIPTION OF THE DRAWINGS

The foregoing and other objects, aspects and advantages are better understood from the following detailed description of embodiment of the invention with reference to the drawings, in which:

FIG. 5 is a Flow Diagram of Pitch Estimation Method in accordance with one embodiment of the invention;

DETAILED DESCRIPTION OF THE INVENTION

Figure 1:
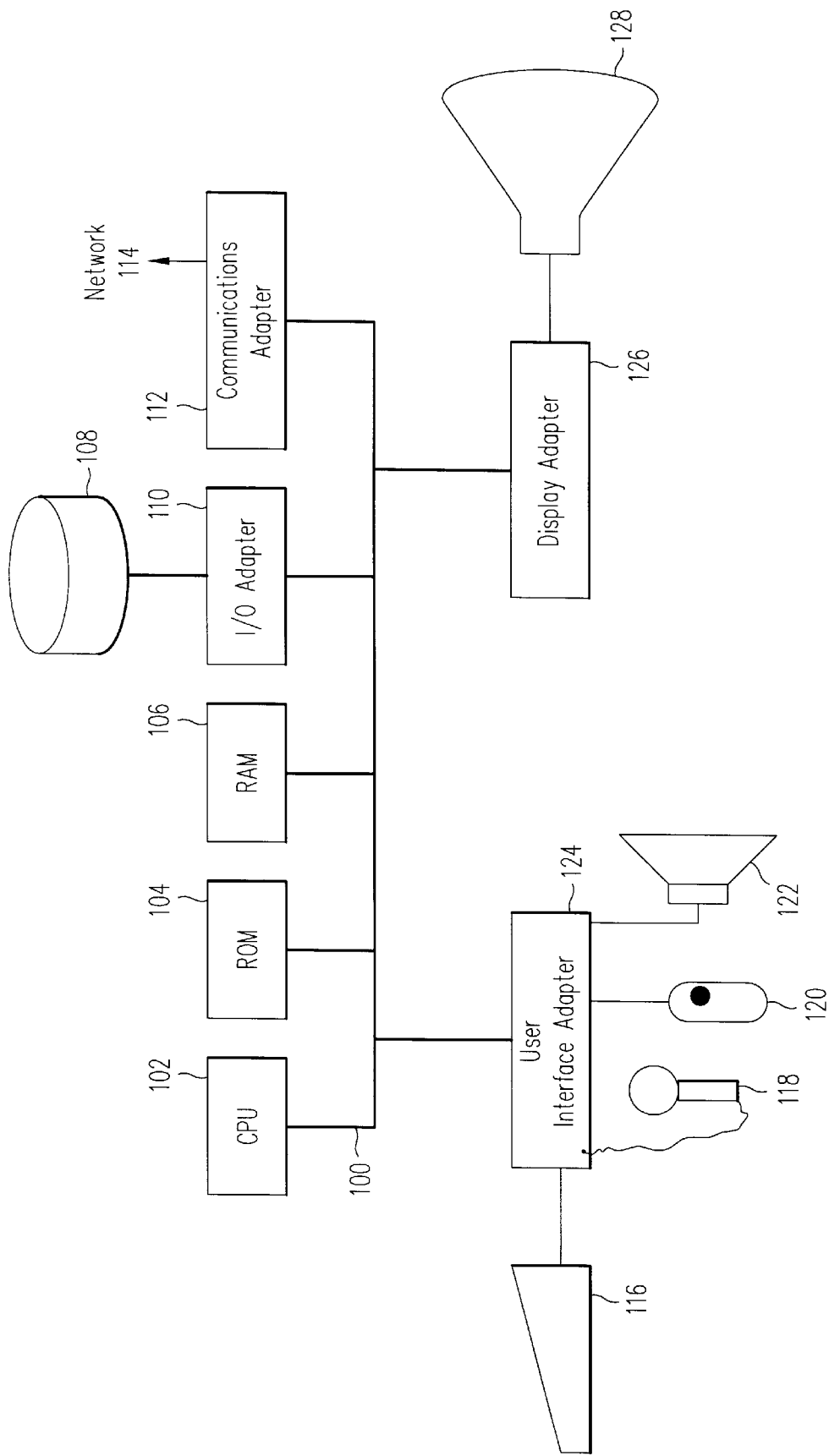
FIG. 1 is a Block Diagram of a Representative Hardware Environment in accordance with one embodiment of the invention.
Figure 2:
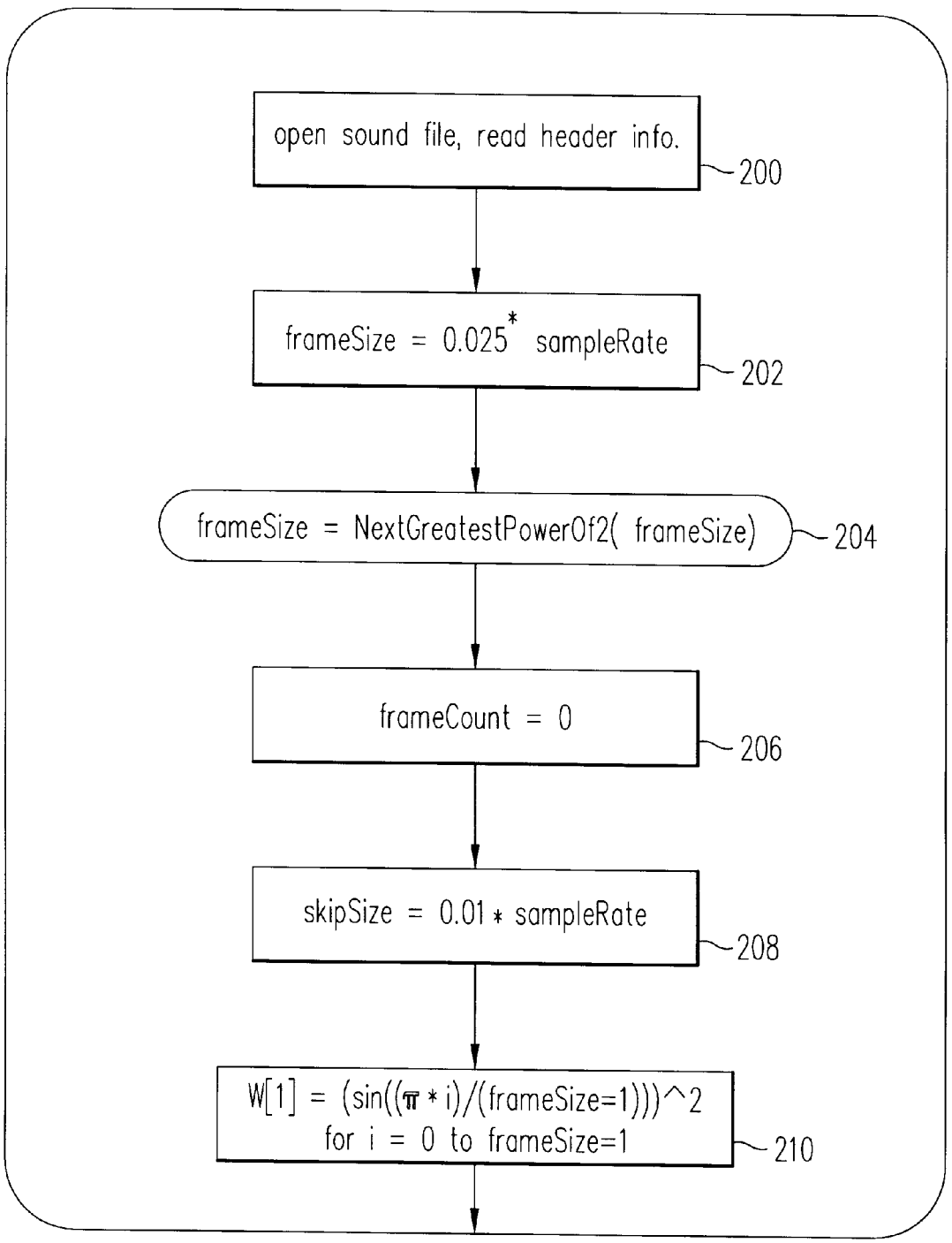
FIG. 2 is a Flow Diagram for Preparing to Read a Sound File in accordance with one embodiment of the invention.
Figure 3:
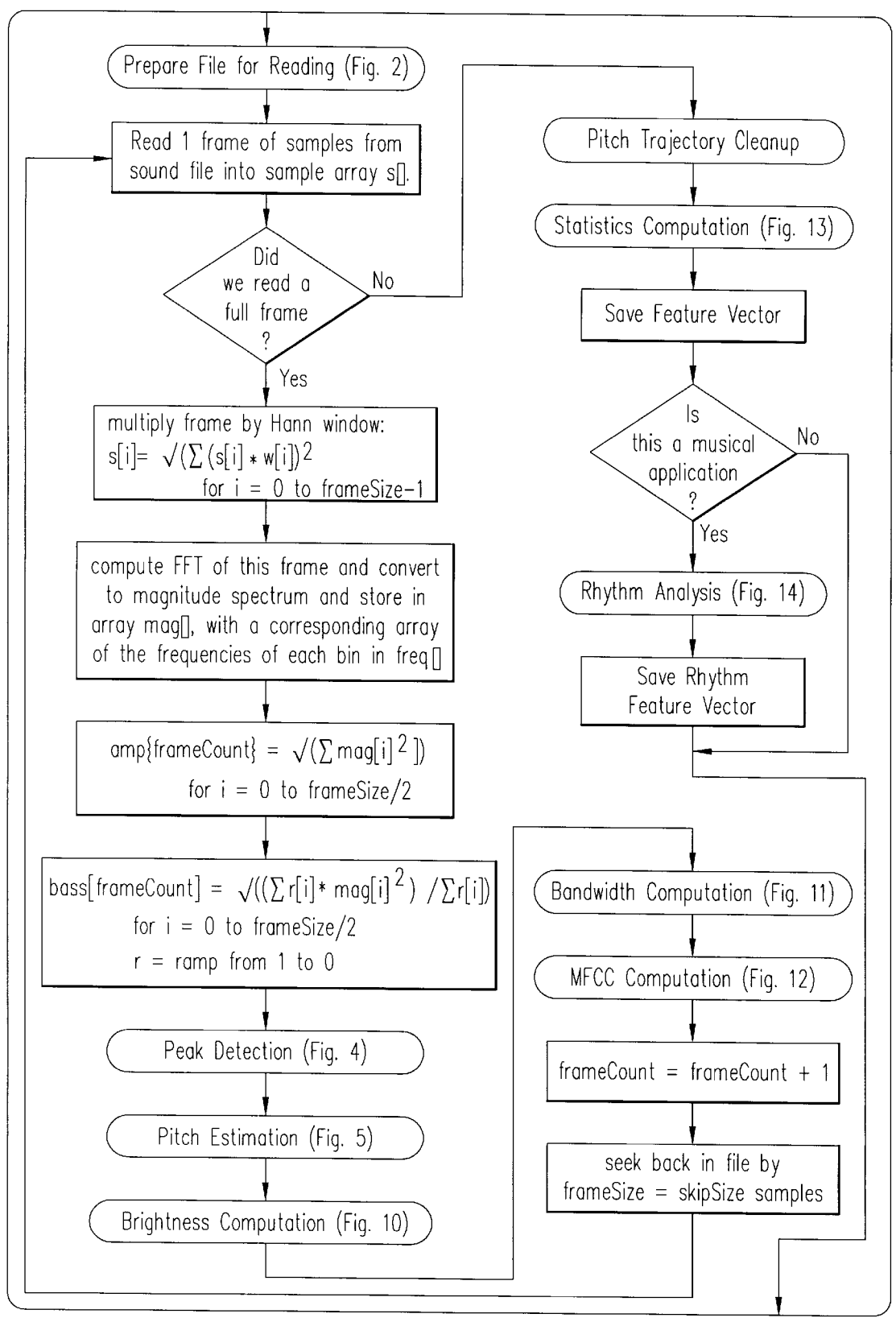
FIG. 3 is a Flow Diagram of Overview of Feature Vector Computations in accordance with one embodiment of the invention.
Figure 4:
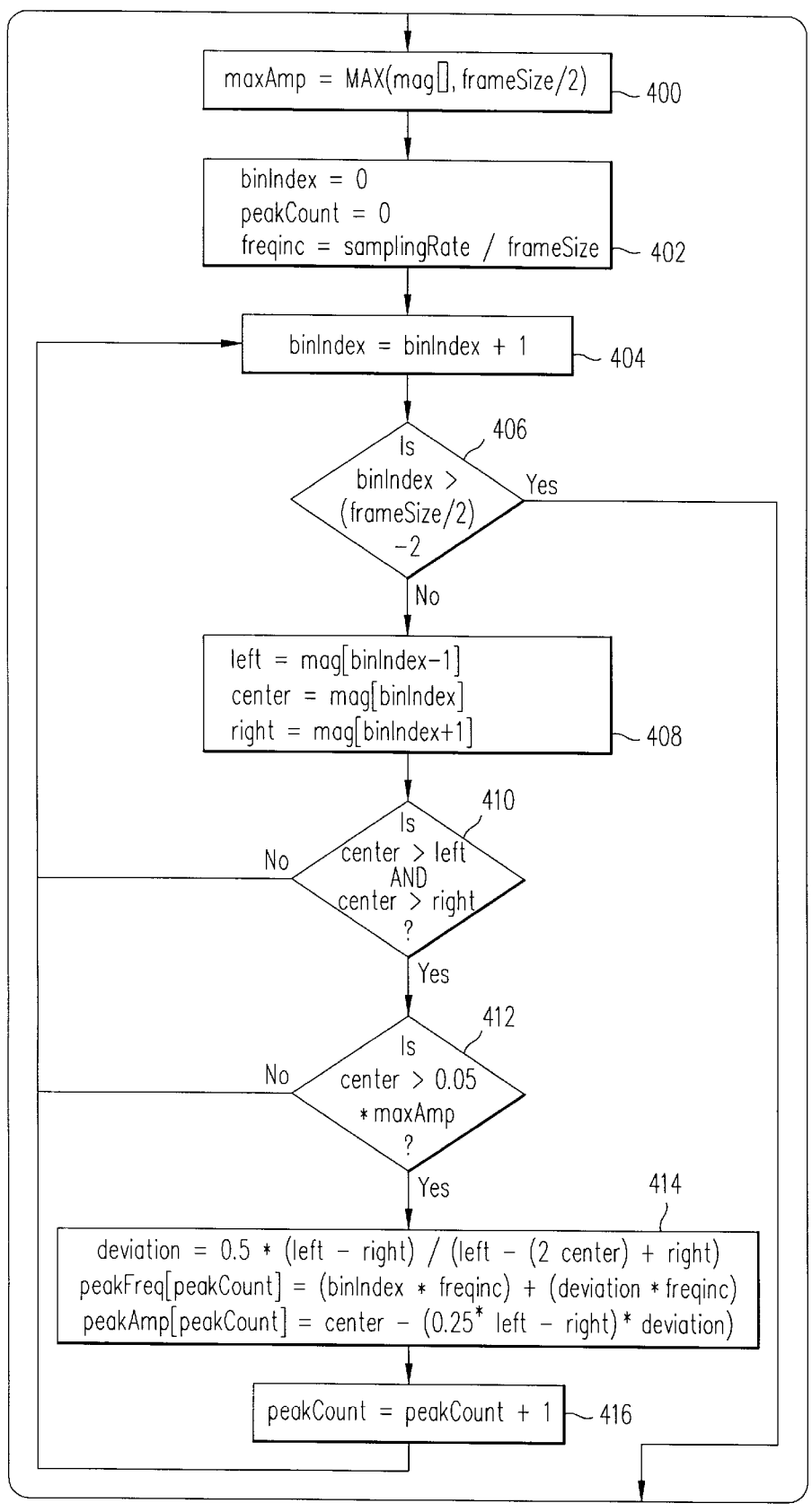
FIG. 4 is a Flow Diagram of Peak Detection Method in accordance with one embodiment of the invention.

The invention is preferably practiced in the context of a relational database system in which the analysis and comparison software has been embedded. A representative hardware environment is depicted in FIG. 1, which illustrates a typical hardware configuration of a workstation in accordance with the subject invention having a central processing unit such as a conventional microprocessor, and a number of other units interconnected via a system bus [100]. The workstation shown in FIG. 1 includes a Random Access Memory (RAM)[106], Read Only Memory (ROM)[104], an I/O adapter [110] for connecting a hard disk drive [108]; a user interface adapter [124] for connecting a keyboard [116], a mouse [120], a speaker [122], a microphone [118], and/or other user interface devices such as a touch screen device (not shown) to the bus, a communication adapter [112] for connecting the workstation to a data-processing network (which can include the Internet) [114] and a display adapter [126] for connecting the bus to a display device [125].

A control element (i.e. machine-readable medium) directs the operation of the workstation. Any suitable machine-readable medium may implement the control element, such as RAM, a magnetic diskette, magnetic tape, or optical disk (the last three being located in disk units). The content-based audio analysis and comparison methods of this invention are contained within the control element which comprises the database management program.

A database is a collection of information stored in a computer. The data is arranged as rows in tables, which represent groups of related information. In this invention, a row of data (called a "record") would represent the N-vector elements and other data (such as file name, sample rate, bit size, etc.) that are associated with a specific sound file. (As mentioned earlier, the term "sound file" can also refer to a segment of a file or to a real-time stream of audio.) The analysis methods described in this invention are used to compute the specific values of the N-vector which are consequently stored in the database record that describes a particular sound file.

In a typical environment, the user would create a new record by specifying the name of the sound file to be analyzed and added to the database. Alternatively, a search engine could automatically find new sound files on the network to be added. Once the file name has been specified, the control element (database management software) would call the methods described by this invention to create the various elements of the N-vector and store them in this record.

After multiple sound files have been analyzed and stored as records in a database, then the control software can perform the comparison of N-vectors in order to find a rank-ordered similarity of sound files.

Analysis of Digital Audio

Once a sound file has been specified by the user, the analysis method will open the file and read the sound file header (if any). The sound file header usually contains certain information about the digital data, such as its sample rate (samples per second), bit length (number of bits per sample), and number of channels (mono, stereo, etc. . . . ). Once these variables have been read then the analysis method iterates over the actual sample values stored in the file and computes the values for the feature vector.

The analysis method will compute new arrays of data values (called trajectories), specifying the amplitude (loudness), pitch, bandwidth, bass, brightness, and Mel-frequency cepstral coefficients (MFCCs) over the length of the sound file. For each of these trajectories, another trajectory of the same length is computed that contains the first derivative of the original trajectory. The first derivative is a measure of how fast the original trajectory changes over time. These complete trajectories are computed during the analysis but generally are not stored in the database. However, for each of these trajectories, the trajectory's mean and standard deviation are computed and stored. (Optionally, the autocorrelation of each trajectory may be used instead of storing the statistics of its first derivative.)

The computations of each trajectory's mean and standard deviation are weighted by the amplitude trajectory so that the perceptually important sections of the sound are emphasized. In addition to the above features, the duration of the sound can be stored.

The feature vector thus consists of the mean and standard deviation of each of the trajectories (amplitude, pitch, brightness, bass, bandwidth, and MFCCs, plus the first derivative of each of these). These numbers are the only information used in the content-based classification and retrieval of these sounds. It is possible to see some of the essential characteristics of the sound by analyzing these numbers.

Details of Analysis Methods

All of the acoustic features are measured every 10 milliseconds using a 25 millisecond window (one "frame") of audio sample data. Note that these are the typical values which work well in general, although our system allows them to be varied. So that we can use an efficient Fourier transform, we adjust the window size so that we have a number of samples which is a power of two. Each window of audio data is called a "frame."

Since the most important perceptual information for a sound is in the lower frequencies, we typically downsample the audio data to a 5–10 kHz sampling rate depending on the nature of the sound. This is done to speed up the acoustic feature extraction. The sampling rate is set so the bulk of the sound energy is below half the sampling rate so that little important information is lost. However, it is not necessary to perform this downsampling and in an ideal computing environment we would not need to worry about efficiency issues.

We make a single pass over all of the samples in the sound file, computing the trajectory values for each frame. The first step in analyzing a sound file is to open the file and read the appropriate information from its header (if any).

FIG. 2: PREPARE FILE FOR READING

The sound file is opened and the header information (specifying sample rate and other parameters) is read [200]. The software variable frameSize is set to ¼0th of the sample rate (specifying a window frame size of 25 milliseconds worth of samples) [202]. This value is then modified to be equal to the smallest power of two [204] larger than the value. The variable frameCount is set to zero [206], specifying that no complete or partial frames of samples have been read from the file yet. The variable skipSize is set to ¹⁄₁₀₀th of the sample rate (specifying that 10 milliseconds worth of samples win be skipped before reading the next frame) [208].

Next, we compute a Hann window function [210]. The array w[] is set according to the formula $$w[i]=(\sin(\pi \cdot i)/(frameSize-1))^2;$$

for i=0 to frameSize−1

Note: If a measure of amplitude that is more correlated to perceived "loudness" is desired, then the Hann window can be normalized by dividing each value of the Hann window computed above by the normalization factor, norm, defined as:

$$norm=\sqrt{\Sigma_i(w[i] \cdot w[i])};$$

for i=0 to frameSize−1

FIG. 3: OVERVIEW OF FEATURE VECTOR COMPUTATIONS

Now that we have prepared the file for reading [300], we now enter the main frame loop. We attempt to read frameCount samples into the array s[] [302]. If we have read a full frame [304] (meaning we did not have an end-of-file condition) then we multiply the samples in this frame by the values in the Hann window array [306].

We then take a discrete Fourier transform using a standard power-of-2 Cooley-Tukey Fast Fourier Transform. The exact form of this computation is not important. Any discrete Fourier Transform algorithm could be used, although the Cooley-Tukey FFT, the Prime Factor and Winograd FFTs are more efficient than a direct computation. The resulting complex spectrum is converted to polar form to get the magnitude spectrum. The magnitude spectrum for this frame is stored in the array mag[] and for convenience, the frequency corresponding to each magnitude element is stored in the array freq[] [308].

Next we compute the amplitude of this frame by taking the square root of the sum of the squares of the first half of the magnitude spectrum [310]. The amplitude for this frame is stored in the amp[] array. We operate over only the first half of the magnitude spectrum (frameSize/2) because of the Nyquist theorem.

For applications that require comparison of musical excerpts, an additional step is performed during the computation of the per-frame amplitude. This step computes a simple measure of the "bassiness" of the spectrum; that is, how heavily the spectrum is weighted towards the low frequencies. This bass measure can be used later in computing the optional rhythmic characteristics of the musical excerpt. The bass measure is given by the following:

$$bass=\sqrt{((\Sigma w[i] \cdot ff[i]^2)/\Sigma w[i])}$$

for i from 0 to maxFft−1, where maxFft is half of the analysis FFT size, and w[i] is a linear ramp function ranging from 0.0 for the highest analysis frequency to 1.0 for the lowest analysis frequency.

Next, the PEAK-DETECTION routine is entered [312]. This routine will find the important peaks within the magnitude spectrum and save them for later use. After the peaks for this frame have been stored, then the PITCH-ESTIMATION [314], BRIGHTNESS-COMPUTATION [316], BANDWIDTH-COMPUTATION [318], and MFCC-COMPUTATION [ ], and routines are called, generating the pitch, brightness, bandwith, and MFCCs values, respectively, for this frame. These values are saved in their corresponding arrays.

We are now done with this frame of data. The variable frameCount is incremented by one [320]. Then we seek back into the sample file by frameSize—skipSize samples [322] and return to the top of the loop, trying to read another frameCount set of samples from the file [302].

When we have read all of the samples in the file (signaled by being unable to read a full frame of data from the file [304]), then we are ready to do the final clean up and statistics computations. The PITCH-TRAJECTORY CLEANUP [324] routine will look over the entire pitch trajectory and smooth the data while removing bad data points. The STATISTICS routine then operates on the amplitude, bass, pitch, brightness, bandwidth, and MFCCs trajectories, successively. It weights each value of the trajectory by the amplitude at that point in time. It then computes the first derivative of the trajectory. Finally, it computes the mean and standard deviation of each trajectory, including the first derivatives.

Finally, the mean and standard deviation of each of the trajectories, including the first derivatives, are stored in the feature vector. This feature vector is then saved [330] in the database record that corresponds to this sound file. Normally the trajectories themselves are not stored, as they consume much more space than do the statistical values. However, there is an option for storing the trajectories (but not their first derivatives), for use by applications that require a more detailed representation of the sound.

We now go on to describe the details of the various subroutines mentioned in the above description.

FIG. 4: PEAK DETECTION

The magnitude spectrum is analyzed to find the peaks. First the maximum value over all of the magnitude spectrum values [400] is calculated. (The function MAX is not described here, but should be well understood by anyone skilled in the art of computer programming.) We then set the variables binIndex and peakCount to zero [402]. The variable freqInc corresponds to the frequency increment between successive bins in the magnitude spectrum and is set to samplingRate/frameSize [402]. The peak-finding algorithm then looks for sample locations in the spectrum where the sample values at either side are lower than the central value.

We increment the binIndex value [404]. If we have looked at half of the magnitude spectrum (frameSize/2), then we are done looking for peaks [406]. The variable center is set to the magnitude of the current bin, and the variables left, and right, are set the magnitude of the bins to the left and right of the current bin, respectively [408]. If the center value is greater than both the left value and the right value, then we have found a peak [410]. If not, then we continue on by looking at the next bin value [404]. Since only the largest peaks are important in the pitch determination of the sound, all the peaks less than 0.05 times the maximum value of the magnitude spectrum are ignored [412]. For each important peak, a quadratic interpolation [414] is performed on the three sample values nearest the peak to obtain an estimate of the peak amplitude and the peak center frequency.

The resulting peaks are collected into two arrays of data, peakFreq[] and peakAmp[], corresponding to frequency and amplitude, respectively, of each peak. The variable peakCount is then incremented by one [416] and the loop is repeated until all of the bins in the magnitude spectrum have been examined [406].

Once there are no more bins of magnitude spectrum to examine, then we proceed to computing the pitch estimation of this frame of sample data.

FIG. 5: PITCH ESTIMATION

Each peak computed in the PEAK-DETECTION routine, above, is possibly the fundamental component of a harmonic series contained within this frame. Also, since some sounds have a reduced or missing fundamental component, we also consider ½ the frequency of each peak to be a candidate fundamental.

We enter the pitch estimation routine by setting the variables peakIndex to zero, and old PeakCount to peakCount [500]. We then add ½ of each existing peak to the list of possible peaks. If peakIndex is equal to oldPeakCount, then we are done adding ½ of each of the existing peaks [502]. If not, then we add a new peak whose amplitude is the same as the current peak's (peakAmp[peakIndex]) and whose frequency is ½ of the current peak's frequency (peakFreq[peakIndex]/2) [504]. We then increment both peakCount and peakIndex by one [506] and check for completion once again [502].

Next we go through the process of estimating the fundamental frequency of this frame by collecting all of the most likely fundamental frequencies. The result of this loop is a set of fundamental candidate frequencies and a measure of their relative likelihood of being the fundamental frequency.

We set the variables peakIndex and candidateCount to zero [508]. We then check for completion of our loop. If peakIndex is equal to peakCount [510] then we have looked at all the peaks and can continue on to PICK BEST CANDIDATE [522]. If not, then we proceed to the ESTIMATE FUNDAMENTAL routine [512]. If this routine stored a value in the variable fund which is not negative one (−1) [514], then the current peak is a candidate fundamental frequency, and its frequency is stored in the array fundCandFreq[] [516]. We then compute a measure of the likelihood that this frequency is the fundamental by computing a corresponding score value in the COMPUTE SCORE routine [518], and storing its results in the array fundCandScore[]. At this point we increment our candidateCount variable [520], increment our peakIndex variable [526], and check to see if we are done looking for fundamentals [510].

FIG. 6: ESTIMATE FUNDAMENTAL

Due to noise in the signal and imperfections in our calculation, we first perform an optimization step which gives us a better estimate of the actual fundamental. We compute the first six values of a harmonic series from each candidate fundamental.

The variable firstFreq is set to the current peak frequency that we are computing the fundamental frequency for, peakFreq[peakIndex] [600]. The variable peakIndex2 represents the index into the peak array for the peaks that are higher in frequency than the current firstFreq, and is set to zero [600]. The variable lastHarmonic is set to negative one (−1) [600] as a flag to say that the previous harmonic was not within the 30% deviation range of the expected value. The variables fundSum and norm are set to zero [600]. The variable fund is set to negative one (−1) [600] as a flag to say that this current peak frequency firstFreq) did not generate a likely fundamental frequency based on the existing peaks.

At the top of the loop, we check to see if peakIndex2 is equal to peakCount [602]. If it is, then we are done generating a possible fundamental for firstFreq and we compute a value for fund by dividing fundSum by norm [628], unless norm is less than or equal to zero [626]. If we are not done checking all the peaks higher than firstFreq, then we find the ratio of the new peak to the firstPeak, by setting the freqRatio to peakFreq[peakIndex.2]/firstFreq [604]. This freqRatio should be close to an integer value if it is part of the harmonic series starting at firstFreq. If freqRatio is less than 0.7, then this peak is much less than the current firstFreq and we continue on checking the next peak [606]. If the freqRatio is greater than six, then this peak is more than six harmonics above the firstFreq and we are done with the main loop [608].

If the freqRatio is between 0.7 and 6.0, then we compute the nearest harmonic number (harmonic) and the deviation from that harmonic number (deviation) [610]. If the deviation is greater than 30%, then we don't consider this peak to be a part of the harmonic series of firstFreq [612]. In this case we set the lastHarmonic flag to −1 [630] and increment the peakIndex2 value [632] and continue checking the next peak.

If the deviation is within 30% of the harmonic number, then we compute two values, an amplitude-weighted version of the deviation (weight) and the amplitude of the peak (amp) [614]. If this harmonic number is not the same as the previous one [616], then we add the weighted deviation to the fundSum variable and add the amplitude to the norm normalization value [618]. We then set the variables lastHarmonic, lastDeviation, lastWeight, and lastAmp [620] in case we need to use them for the next peak, which might be closer to the harmonic number.

If harmonic is the same as the lastHarmonic [616], then we need to see if this peak is a better fit for this harmonic value than the previous peak. If the new deviation value is less than lastDeviation [622], then we need to replace the weighted deviation and normalization values from the previous peak in the fundSum and norm variables [624]. If the new deviation is greater than the last deviation, then we just continue [622] with the loop leaving the last deviation for this harmonic number as is.

The final result of the ESTIMATE FUNDAMENTAL routine is the amplitude-weighted fundamental frequency that is predicted by the 6 peaks closest to the 6 harmonics above the firstFreq value. This value is contained in fund [628].

Referring back to FIG. 5, if the value of fund is not −1, then we add this candidate for the fundamental frequency to the fundCandFreq[] array [516], and then compute a likelihood score for this candidate in COMPUTE SCORE.

FIG. 7: COMPUTE SCORE

Figure 6A:
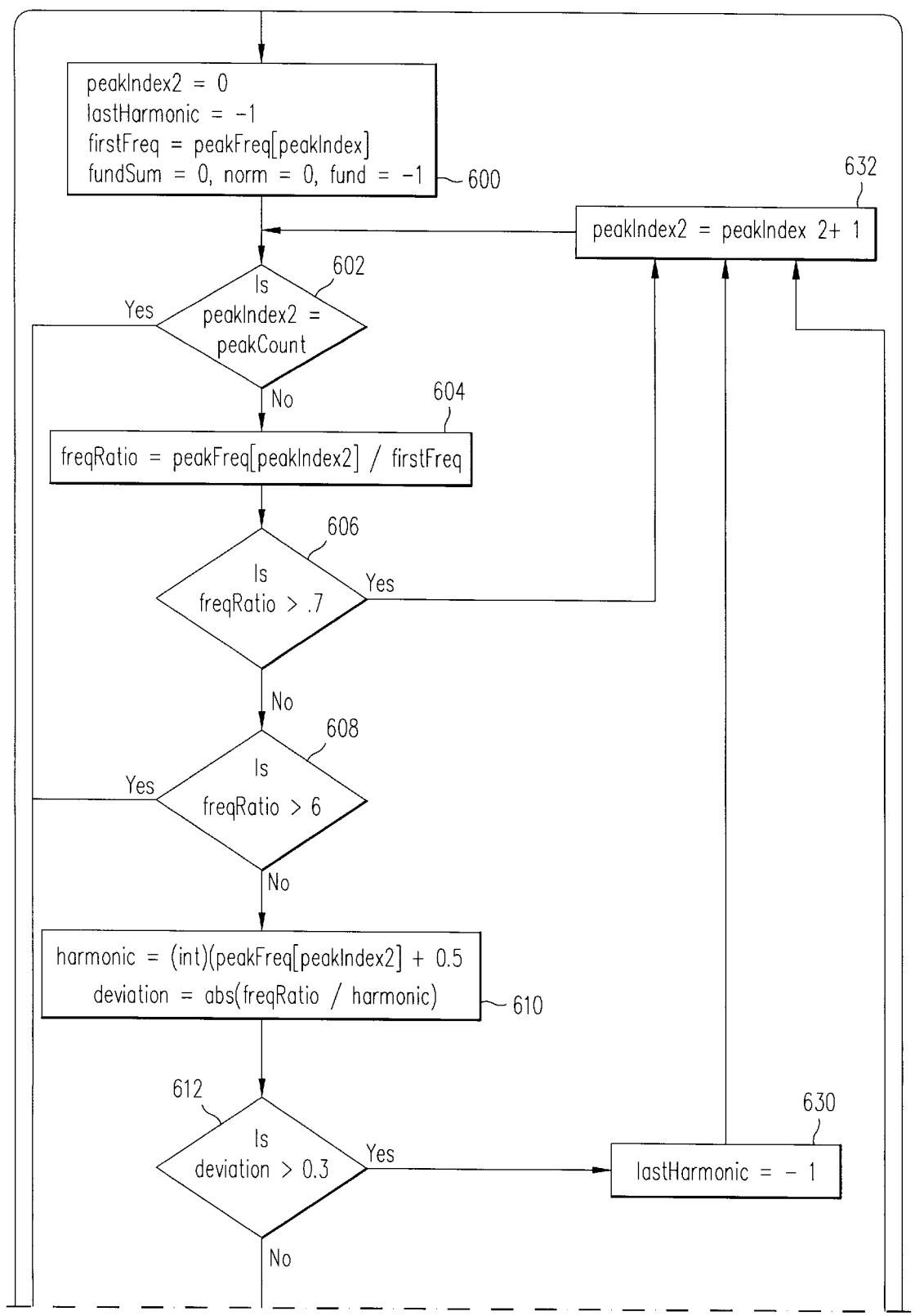
FIG. 6 is a Flow Diagram of Fundamental Frequency Estimation Method in accordance with one embodiment of the invention.
Figure 7A:
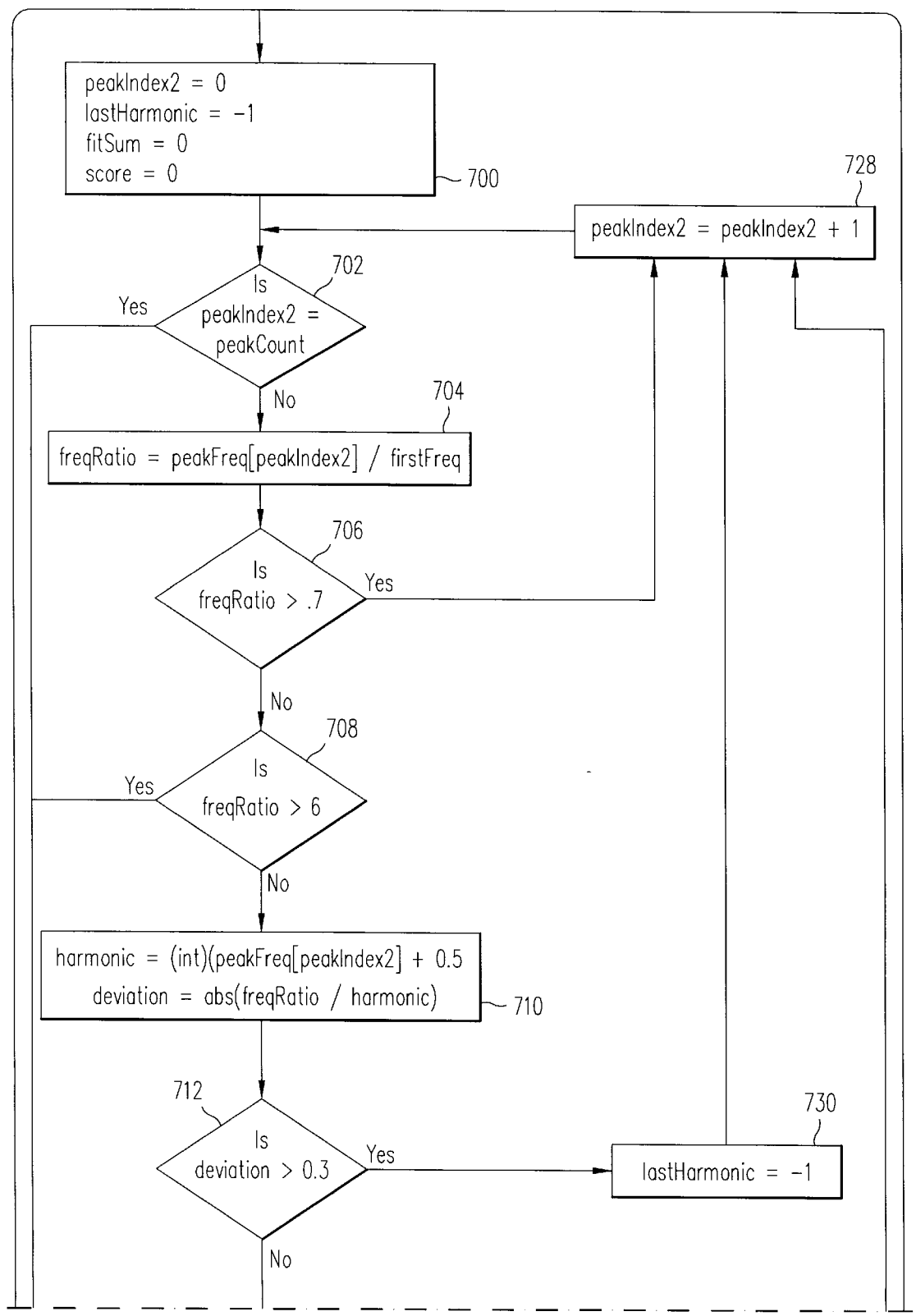
FIG. 7 is a Flow Diagram of Fundamental Score Computation Method in accordance with one embodiment of the invention.

Each of these optimized fundamental candidates is then given a score. This score represents how well a harmonic series built on that candidate fits all the peaks in the peak list. This is done in a manner similar to the six-harmonic series created to find candidate fundamentals (ESTIMATE FUNDAMENTAL). FIG. 7 is almost identical to FIG. 6, except that for each peak which is within 30% of a harmonic, an amplitude-weighted score values is computed [714] as:

$$weight = peakAmp[peakIndex2] \cdot (1 - deviation/0.3) \cdot (1 - (harmonic-1)/60)$$

The sum of the weight values is stored in fitSum [718]. When all of the peaks in this frame have been checked, then the final score is computed as the ratio of fitSum to fftNom. The variable fftNorm is equal to the sum of amplitudes of all of the fft frequency bins. This score value is stored in the array fundCandScore[candidateCount] [726] which is the corresponding the score of the value in fundCandFreq[candidateCount]. At this point in FIG. 5, the variable candidateCount is incremented by one [520], the next peak is checked to see if it is a likely candidate.

FIG. 8: PICK BEST CANDIDATE

The highest scoring fundamental (the fundamental frequency with the highest value of fundCandScore[]) becomes the pitch estimate for the current frame.

Figure 8:
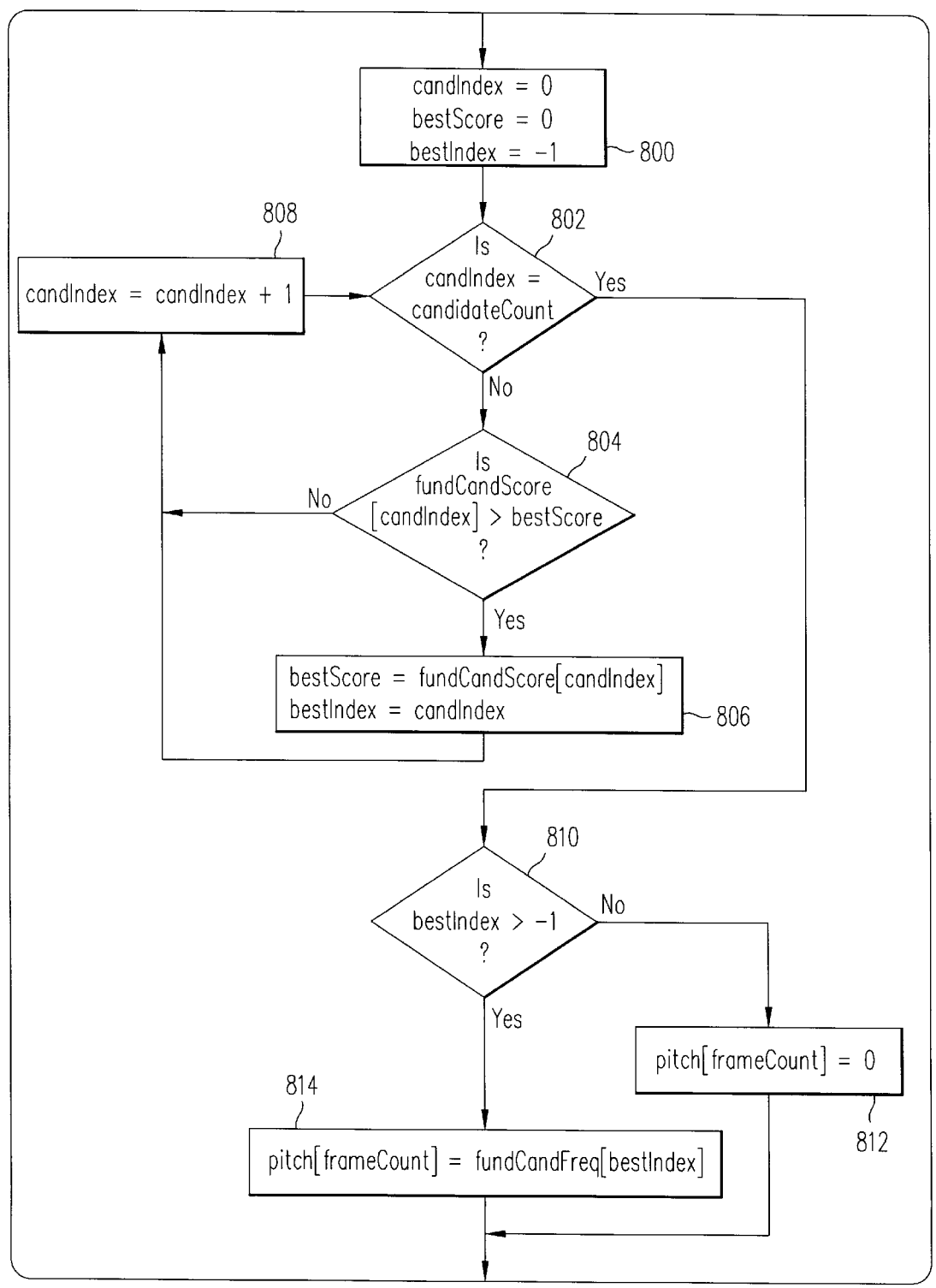
FIG. 8 is a Flow Diagram showing Picking The Best Candidate Method in accordance with one embodiment of the invention.

FIG. 8 shows how this is computed. The variables candIndex, bestScore, and bestIndex are all initialized to zero [800]. If candIndex is equal to candidateCount [802], then we are done checking the candidates and we set the value of the pitch trajectory (pitch[frameCount]) to be equal to fundCandFreq[bestIndex] [814] (unless the bestIndex is not greater than negative one (−1) [810], in which case we set the pitch of the current frame to be zero [812]). Otherwise, we check the score of each candidate. If the current candidate's score is better than the best score so far [804], then the variable bestScore and bestIndex are updated [806]. Then we increment the candIndex value [808] and check to see if we are done [802].

FIG. 9: COMPUTE CONFIDENCE

Figure 9A:
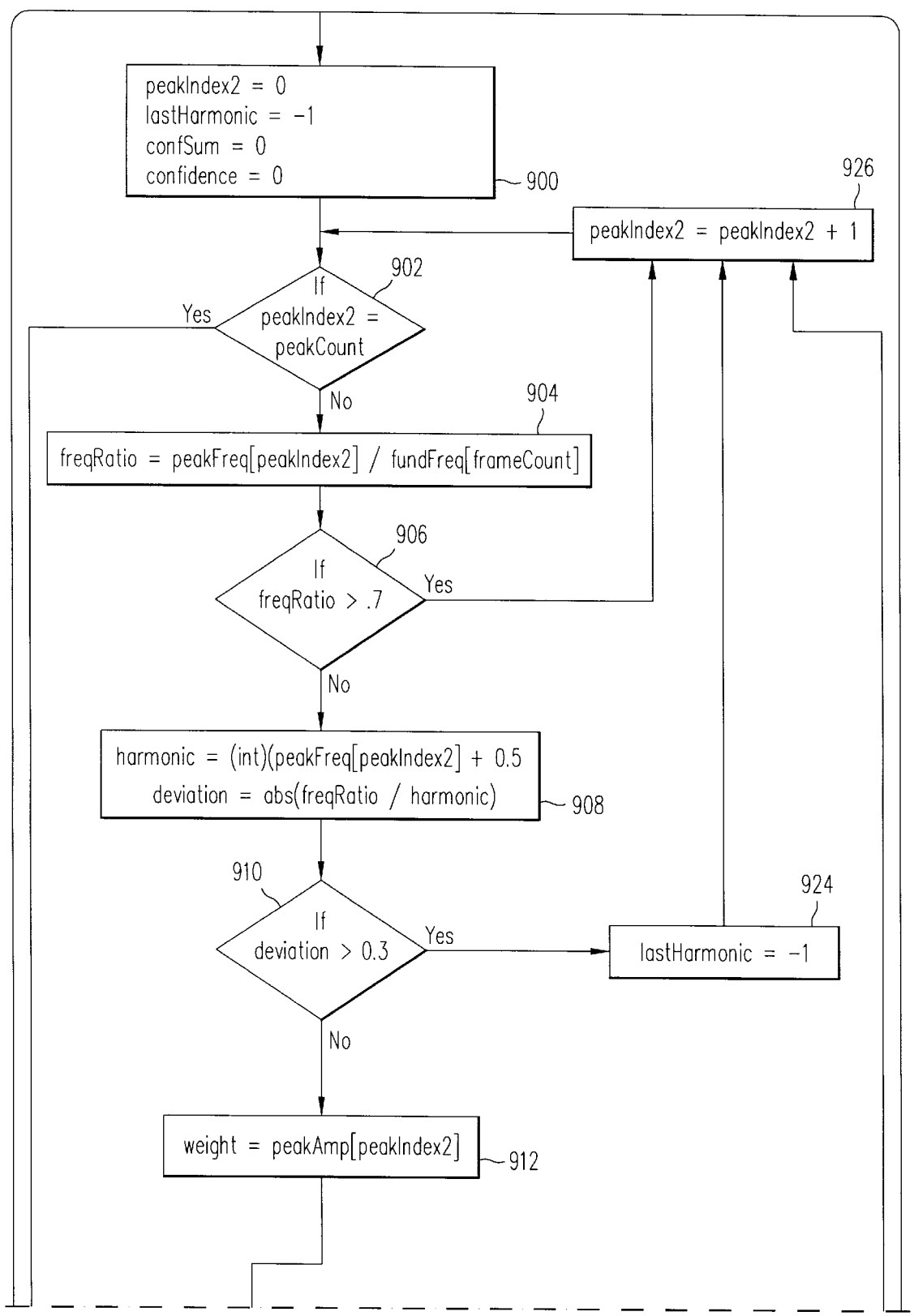
FIG. 9 is a Flow Diagram showing the Compute Confidence Method in accordance with one embodiment of the invention.
Figure 10:
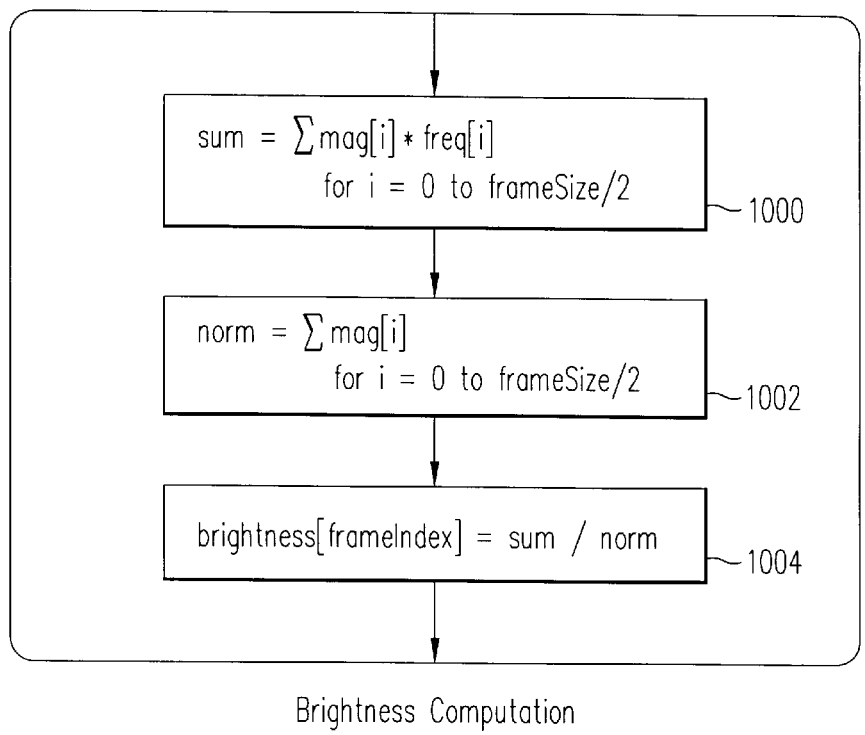
FIG. 10 is a Flow Diagram showing Brightness Computation Method in accordance with one embodiment of the invention.
Figure 11:
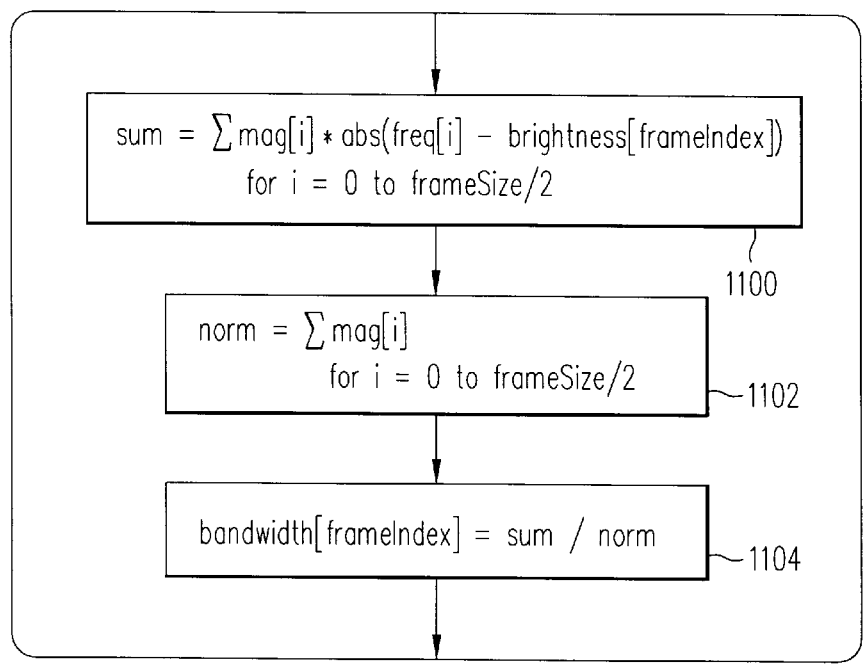
FIG. 11 is a Flow Diagram showing Bandwidth Computation Method in accordance with one embodiment of the invention.

Each fundamental estimate is associated with a confidence value. FIG. 9 shows the steps in the confidence computation. The confidence value is computed using the same algorithm used for the "score" (COMPUTE SCORE), except that the harmonic series is not stopped after six partials. The accumulation is carried out until all peaks in the peak list peakFreq[]) have been considered. Also, the confidence value is simplified to be the sum of the amplitudes of the peaks in the harmonic series [912, 916].

After all of the peaks in the harmonic series have been considered, we divide the sum of the weights by the value of fftNorm which is the sum of amplitudes of all of the fft frequency bins [928]. Now we have two values for this frame, the fundamental pitch estimate, stored in pitch[frameCount] and the fitness score for this pitch estimate which gives us a measure of confidence in this pitch value (stored in pitchConfidence[frameCount]).

At this point we are done with the PITCH-ESTIMATION (FIG. 5) routines and we can move on to the remaining trajectory calculations.

FIG. 10: BRIGHTNESS COMPUTATION

Brightness is computed from the magnitude spectrum, mag[], produced as a result of the FFT. The centroid of these magnitudes is computed using the following steps. First the variable sum is computed as the sum of the product of the amplitude of each frequency bin (mag[i]) and the frequency of each bin (freq[i]), over the first half of the bins (frameSize/2) [1000], Then the variable norm is computed as the sum of all the magnitudes (mag[i]) over the first half of the bins (frameSize/2) [1002]. The brightness for this frame (brightness[frameCount]) is then computed as sum divided by norm [1004]. That is, the brightness is the amplitude-weighted average of the frequency spectrum.

FIG. 11: BANDWIDTH COMPUTATION

Bandwidth is computed similarly to brightness, although here we are looking at the average spread of the frequency magnitudes from the centroid. First the variable sum is computed as the sum of the product of the amplitude of each frequency bin (mag[]) and the absolute value of the difference between the frequency of this bin and the brightness of this frame, over the first half of the spectrum (frameSize/2) [1100]. Then the variable norm is computed as the sum of all the frequency amplitudes (mag[i]) over the first half of the bins (frameSize/2) [1102]. The bandwidth for this frame (bandwidth[frameCount]) is then computed as sum divided by norm [1104]. That is, the bandwidth is an amplitude-weighted average of the differences between each frequency magnitude and the brightness.

FIG. 12: MFCC COMPUTATION

A Mel is a psychoacoustical unit of frequency. The conversion from Hz to Mels can be approximated by the formula $$Mel(x) = 2595 * \log 10(1 + x/700)$$

Mel-frequency cepstral coefficients (MFCCs) are frequently used in speech research. This well-known technique runs the input sound through a set of overlapping triangular filters whose center frequencies are equally spaced in Mels, and then it produces the cepstrum of the filtered result.

Figure 12:
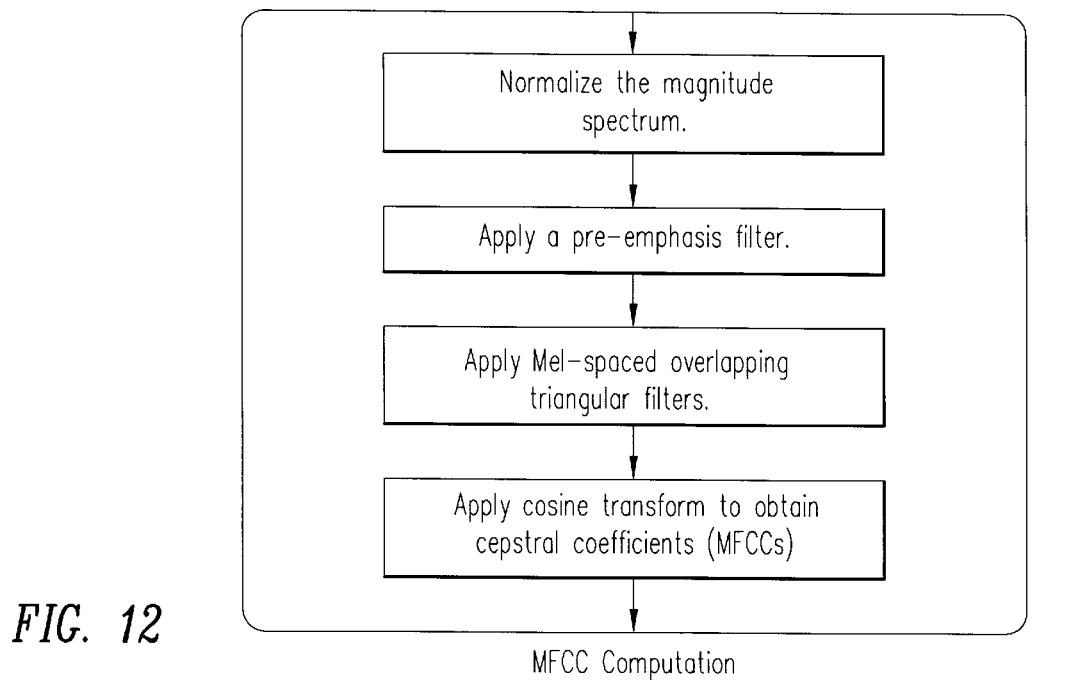
FIG. 12 is a Flow Diagram showing MFCC Computation Method in accordance with one embodiment of the invention.
Figure 13:
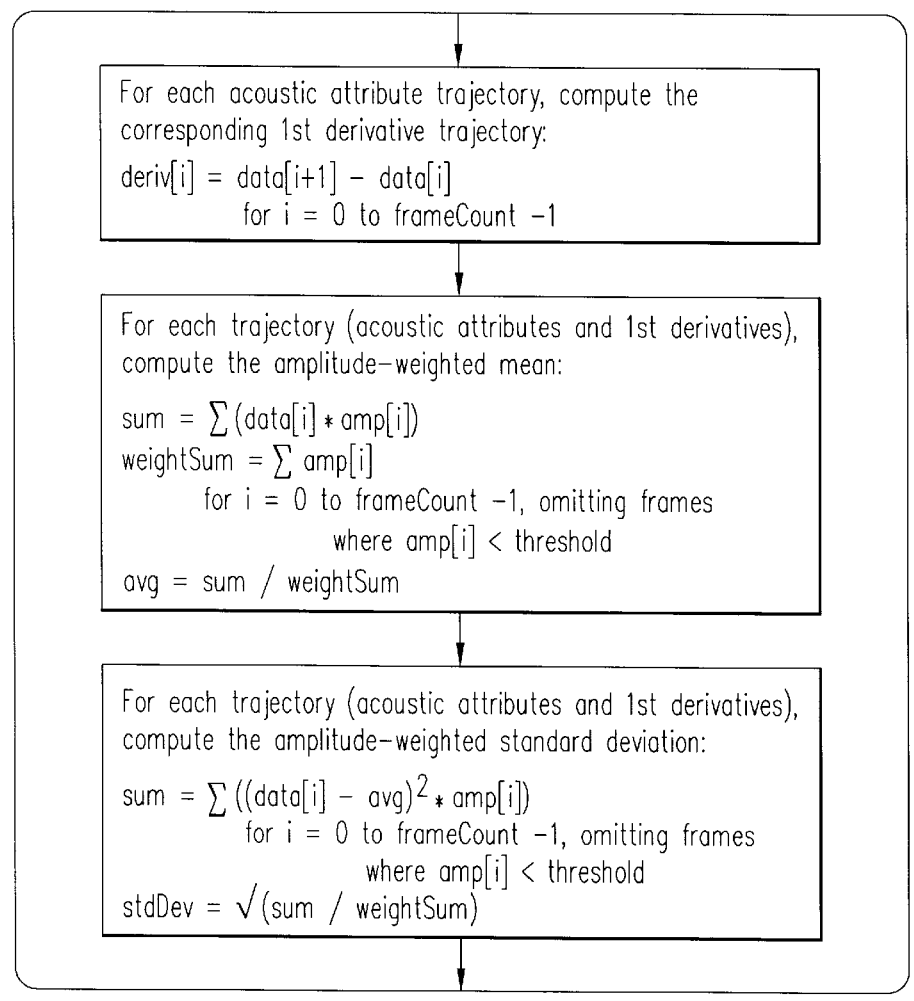
FIG. 13 is a Flow Diagram showing Statistics Computation Method in accordance with one embodiment of the invention.
Figure 14:
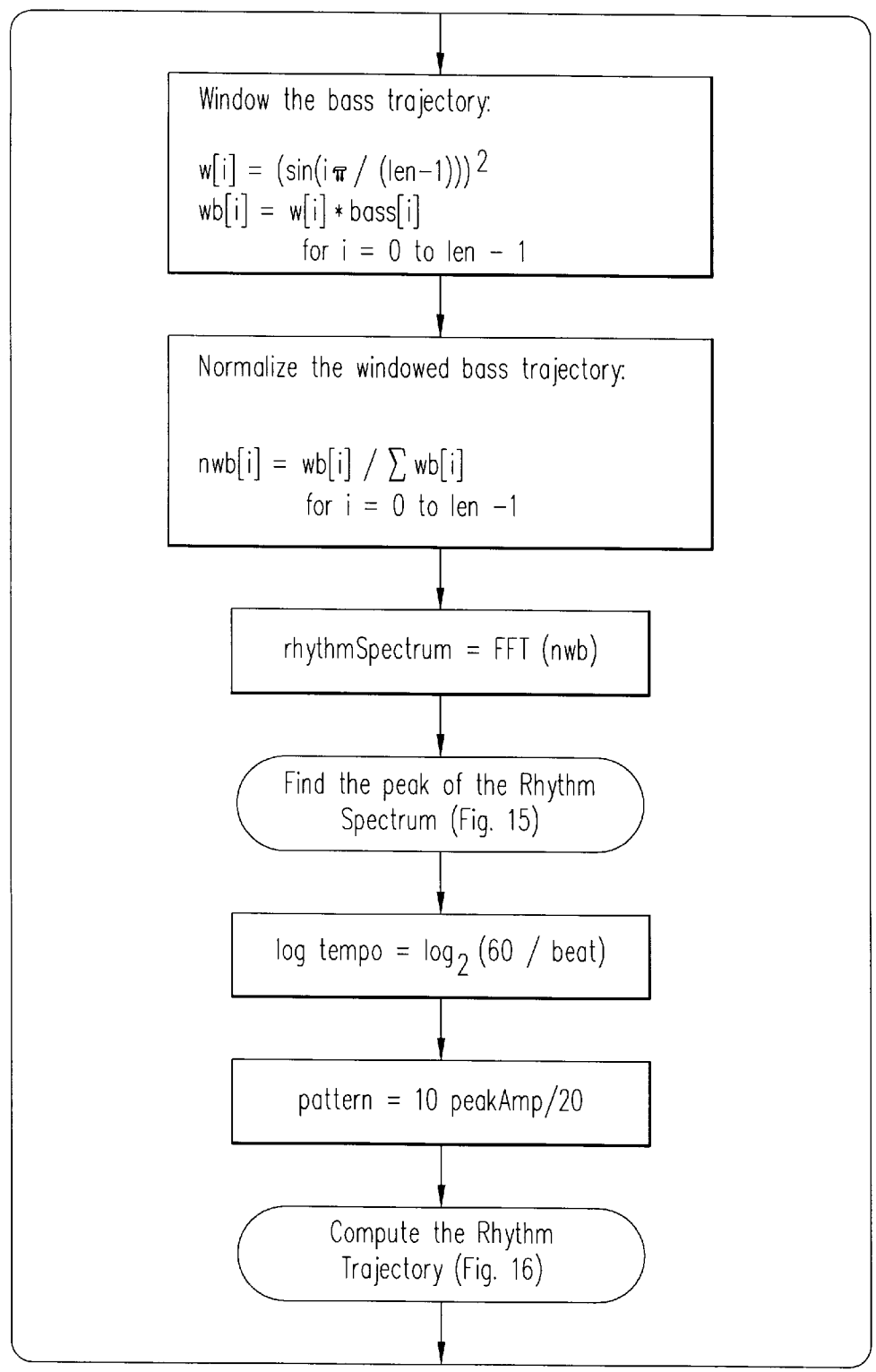
FIG. 14 is a Flow Diagram showing Rhythm Analysis Method in accordance with one embodiment of the invention.
Figure 15:
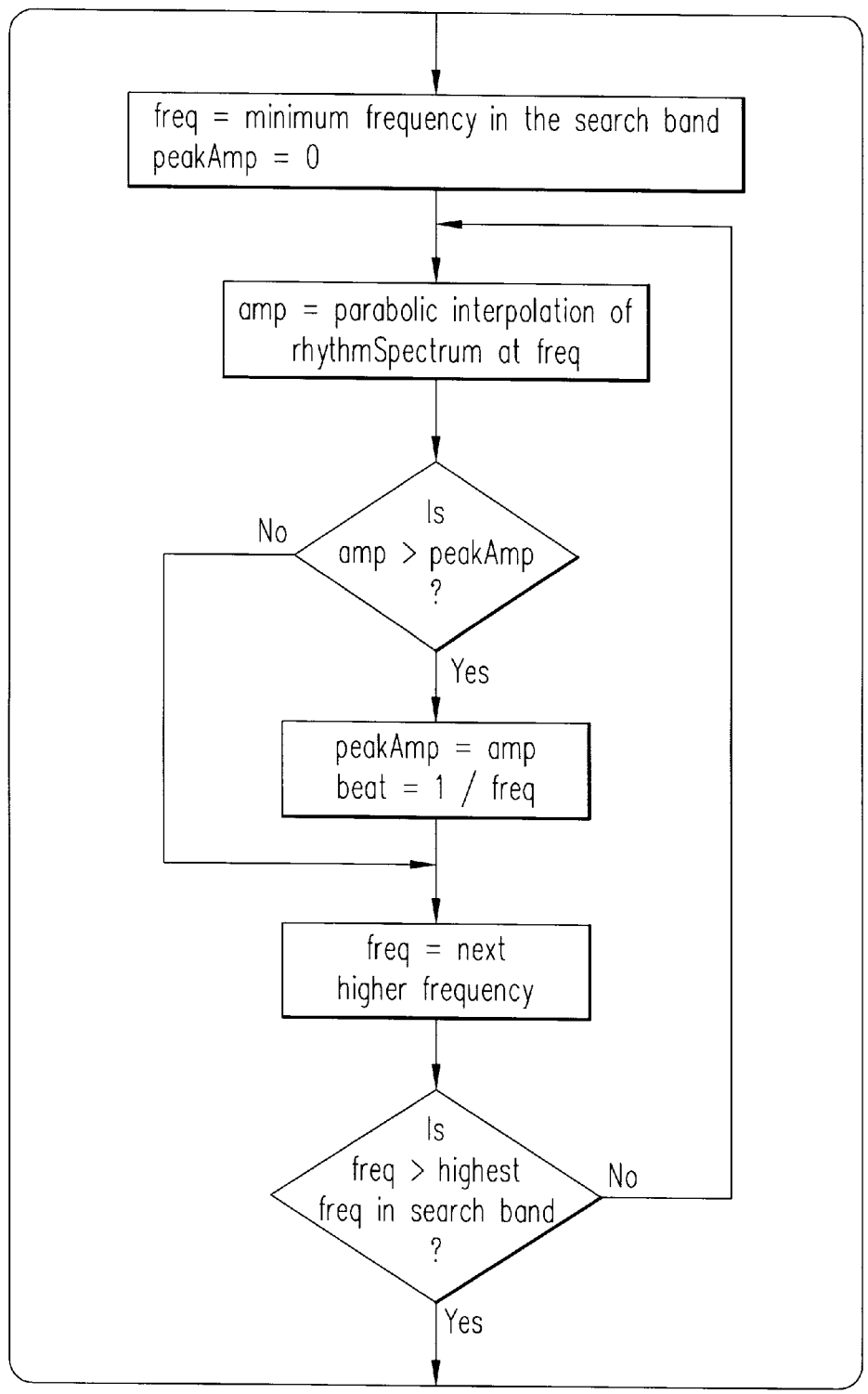
FIG. 15 is a Flow Diagram showing Method of Finding the Peak of the Rhythm Spectrum in accordance with one embodiment of the invention.
Figure 16:
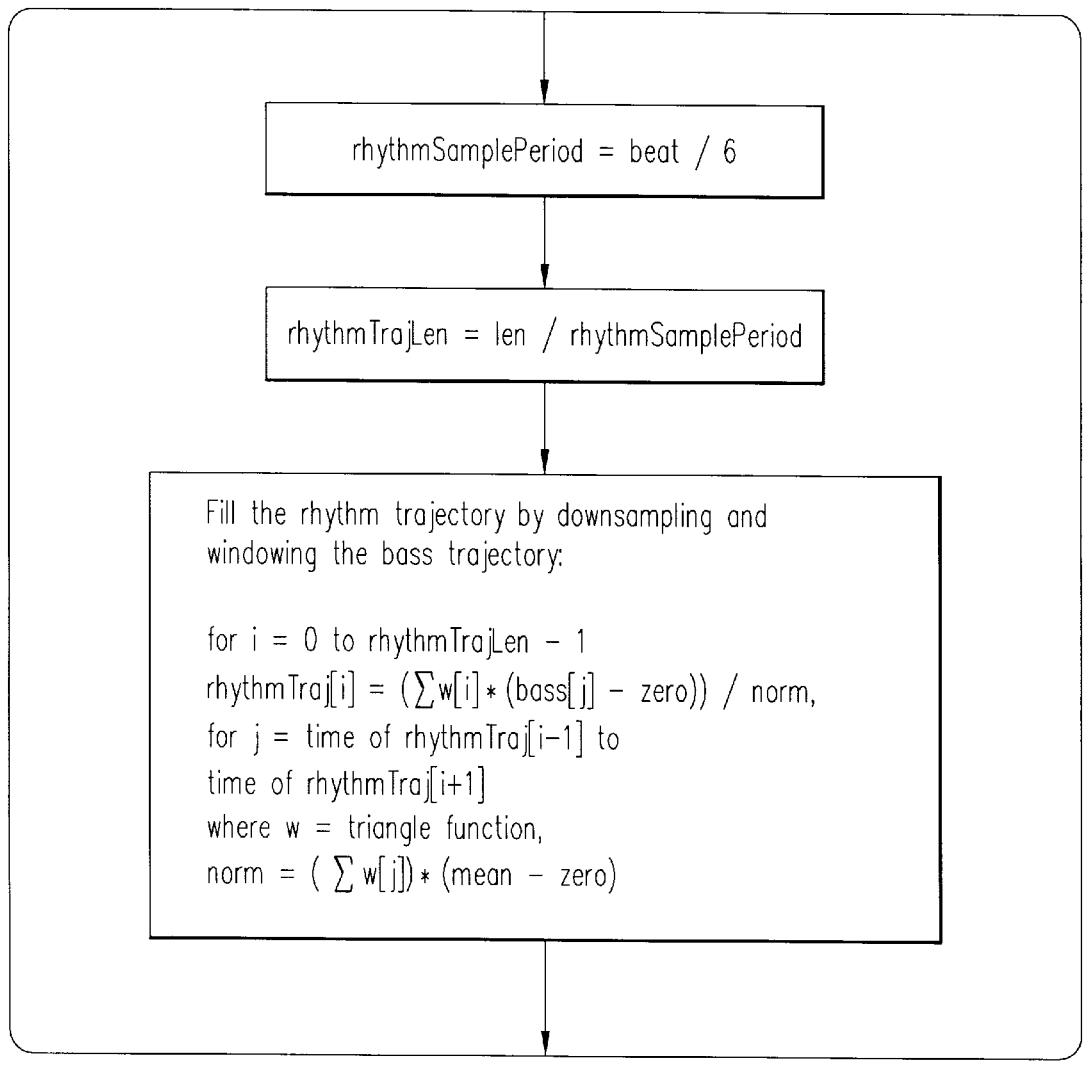
FIG. 16 is a Flow Diagram showing Rhythm Trajectory Computation Method in accordance with one embodiment of the invention.

The first step in the MFCC computation (FIG. 12) is to normalize and pre-emphasize the magnitude spectrum of the input sound, as generated previously by the FFT. The spectrum is normalized by dividing each spectral value by the maximum amplitude, to make the range go from 0.0 to 1.0. Then each normalized spectral value is multiplied by the corresponding value of a pre-emphasis filter. The equation for the pre-emphasis filter is:

$$filter(x) = \sqrt{((1-p \cdot \cos(x))^2 + (p \cdot \sin(x))^2)}$$

where x is digital frequency from 0 to $\pi$

The next step is to apply the Mel filter, by multiplying each value of the normalized and pre-emphasized magnitude spectrum by the triangular filters. The filtered spectrum is then converted to a dB scale. The final step is to convert this Mel-filtered spectrum to a cepstrum by applying a cosine transform. The cosine transform is expressed by the following equation, which computes the value of the ith cepstral coefficient:

$$cepstrum[i] = \Sigma 2 \cdot Melspectrum[j] \cdot \cos(i \cdot j \cdot \pi / N)$$

for $j=0$ to $N-1$
where N is the number of Mel filters.

PITCH TRAJECTORY CLEANUP

After all the trajectories for all the frames are computed, a "clean-up" step is performed on the pitch trajectory to remove errors which might have occurred in the estimates.

This clean-up step consists of three phases: (Phase 1) a removal of "jumps" in the pitch trace, (Phase 2) a median filtering of the pitch trace and, (Phase 3) a removal of low-confidence pitch values.

Phase 1: Jump Removal

A typical error in the pitch estimation is to choose the wrong peak as the fundamental. This will typically happen for a few frames, after which the estimate will return to the correct value. The symptom is a sudden jump in pitch estimate where the ratio between the neighboring estimates is approximately an integer (due to the nature of the harmonic series). To detect this error, Phase 1 looks at the ratios of neighboring pitch estimates. If the ratio between the first two pitch estimates is approximately an integer greater than 1, the algorithm continues along the series looking for other such jumps. If a series of jumps yields a series of approximately integer ratios which, multiplied together, are approximately 1, the algorithm alters all the intervening pitch estimates to remove the jumps. That is, each estimate is divided down or multiplied up by the integer corresponding to the accumulation of integral pitch jumps at that point.

Phase 2: Pitch Trajectory Filtering

Another typical error in the pitch estimation is due to noise or overlapping of sounds, possibly due to reverberation. The symptom is a totally incorrect value over a few frames. The second phase of the cleanup algorithm looks over 11 frames (by default) of the pitch trace, sorts the pitch estimates for all these frames and computes the median. It then tests the pitch estimate in the center (the 6th frame of the 11) to see if it is more than 20% (by default) away from the median. If it is, the pitch estimate of the center frame is replaced by the median value.

Phase 3: Low-confidence Pitch Removal

Finally, pitch estimates whose pitch confidence value is too low are removed. This is performed in Phase 3 of the cleanup algorithm by computing the average pitch confidence over 5 frames (by default) and setting the center frame's (the 3rd of 5) pitch estimate to 0 if the average confidence is less than 0.5 (by default).

After the pitch trajectory cleanup phases have been executed, then the pitch trajectory is much more robust. Once the amplitude, pitch, bass, brightness, bandwidth, and MFCC trajectories have been computed, the statistical values of each trajectory must be computed.

FIG. 13: STATISTICS COMPUTATION

The STATISTICS routine [ ] performs amplitude-weighted computations on the amplitude, bass, pitch, brightness, bandwidth, and MFCCs trajectories, successively. The amplitude weighting causes the statistical values to depend more on the louder parts of the sound file, less upon the quiet parts, and not at all upon silent parts. This helps ensure that the perceptually salient portions of a sound are given more importance in the sound's characterization.

First, the amplitude trajectory is examined to find the sound file's maximum amplitude. A threshold is determined as a fraction (typically 1 percent) of the sound file's maximum amplitude. Portions of the sound that fall below this threshold are ignored when computing the statistics.

Then, for each trajectory, the mean and standard deviation are computed, as well as the mean and standard deviation of the trajectory's first derivative. These computations are weighted by the amplitude. For each frame of the trajectory, the corresponding amplitude frame is examined. If the amplitude is below the threshold, this frame is skipped. Otherwise, the current value of the trajectory is multiplied by the corresponding amplitude value. The first derivative is computed by subtracting the value of the current frame from the value of the next frame. The first derivative is weighted by the current amplitude, just as the original trajectory was.

The mean is computed using the following formula:

$$\mu = (\Sigma data[i] \cdot amp[i])/\Sigma amp[i]$$

The standard deviation is computed using the following formula:

$$s = \sqrt{(\Sigma data[i]^2 \cdot amp[i]) - \mu^2}$$

In these equations, data[i] refers to the current value of the trajectory nder consideration (whether amplitude, pitch, brightness, bandwidth, one f the MFCC coefficients, or the first derivatives of any of these). amp[i] refers to the corresponding value of the amplitude trajectory.

At this point, we have finished computing all the trajectories, taken their first derivatives, and finished computing the means and standard deviations of each of these. Now all these means and standard deviations are stored in the feature vector, typically in a database record associated with the sound file. The duration of the sound can also be stored in the feature vector; if not, it is typically available elsewhere in the database record. The trajectories themselves can also be stored, for use by applications that require frame-by-frame matches, as opposed to statistical matches.

FIG. 14: RHYTHM ANALYSIS

For applications that require comparison of musical excerpts, another analysis step is optionally performed. This step captures some of the rhythmic features of the audio into a separate "rhythm feature vector." The rhythm analysis makes use of the bass parameter that has been stored in the main feature vector. It is assumed that the most periodic aspects of rhythm are likely to occur in the bass instruments (although not exclusively), which is a reasonable assumption for most music. Treble instruments typically have more quick-moving and variable rhythms, while bass instruments typically accentuate the musical beat.

If the rhythm option is chosen, an FFT is performed on the bass trajectory. This yields a spectrum whose x-axis measures distances in time, and whose peaks indicate the most frequent separation in time between bass notes. For example, if the bass drum usually plays on the first beat of the measure, the time separation corresponding to one measure will show up as a peak.

The spectrum is normalized so that its maximum value is 1.0. The search through the spectrum's frequencies is limited to a "search band," consisting of a maximum and minimum time separation. (The minimum corresponds to one beat per second, and the highest corresponds to three beats per second.) This way, peaks at very large time separations are interpreted as not the actual beat of the music, but as a time interval comprising several beats. Similarly, the minimum time separation avoids excessively small time intervals. For example, if the bass player is playing in sixteenth notes, these should be interpreted not as the beat, but as subdivisions of the beat.

To find the peak, we step through the spectrum from the lowest to the highest frequency in the search band. At each step, we compute a parabolic interpolation of the amplitude. If the resulting amplitude is greater than any previously found, this step temporarily represents the peak. We save the reciprocal of this frequency in the variable "beat," which measures the time separation, and we save the amplitude in the variable "peakAmp." After stepping through all the frequencies, we have found the peak's amplitude and the distance in time between beats.

The rhythm feature vector consists of features named "inverse duration", "log tempo", "pattern", and "rhythm trajectory." The meaning of these features is as follows:

"inverse duration" stores the reciprocal of the duration of the sound. This feature's value is already known and thus does not need to be computed during the rhythm analysis.

"log tempo" stores the tempo on a log scale (base 2), using the following formula:

$$log\ tempo = log_2(60/beat)$$

The number 60 converts from beats per second to musical tempo, which is traditionally measured in beats per minute.

"pattern" stores a measure of how patterned the rhythm is, as determined by the maximum height of the bass trajectory's spectrum:

$$pattern = 10\ peakAmp/20$$

"rhythm trajectory" is an array of values representing a time function that captures the rhythm pattern. To fill this array, the bass trajectory is sampled at a rate of ⅙th of a beat, using the value of "beat" as determined above. The sample rate is related to the beat in order to make rhythm trajectories independent of tempo. This independence allows the system to identify two musical excerpts as having similar rhythms, even if one excerpt has a faster tempo.

Setting the rhythm trajectory=s sampling rate to ⅙ beat captures the most common musical subdivisions of a beat (namely, duplets and triplets). A higher sampling rate, such as 1/24 beat, would pick up finer subdivisions. However, higher sampling rates also tend to pick up rhythmically unimportant details that are due to deviations of the musician's performance from a strictly metronomic, theoretical performance. These deviations can be intentional expressive effects, or they can indicate a sloppy performance. The rhythm trajectory is filtered with a triangular window to smooth these small deviations. At each sample, the triangular window extends from the previous sample to the next, so that the peak of the triangle, with amplitude 1.0, occurs at the current sample, and ends of the triangle, with amplitude 0.0, occur at the previous and next samples. This filtering gives notes that occur at the sample time a higher weighting than notes that occur between samples.

The formula for the amplitude of element i in the rhythm trajectory is:

$$rhythmTraj[i] = \Sigma((bass[j]-zero) \cdot w[j])/((\Sigma(w[j])) \cdot (mean-zero))$$

where j is the summation index, which goes from the time of rhythmTraj[i−1] to the time of rhythmTraj[i+1];
w is a symmetrical triangular filter function, going from 0 at the time of rhythmTraj[i−1], to 1 at the time of rhythmTraj[i], to 0 at the time of rhythmTraj[i+1];

bass is the bass trajectory;

mean is the mean value of bass over the entire bass trajectory;

and zero is the minimum possible value of bass (−100 dB).

COMPARING SOUNDS

Once a database of feature vectors has been created, it is now useful to be able to retrieve sound files based on the vector information (which is a representation of the content of the sound file). It is possible to retrieve sound files directly by submitting constraints on the values of the vector to the database system. For example, the user can ask for sounds in a certain range of average pitch or brightness. This is a straightforward database task and will result in all database records which have the specified elements of the vector within the specified ranges.

It is also possible to ask for sounds from the database which are similar to a certain sound file. In this case, the vector for the sample sound file will be created. Then all database records will be measured for how similar their vector is to the sample vector. (The following discussion concerns comparison of the main feature vectors only. For musical applications, the optional rhythm feature vectors are also compared, using the technique described later under "Comparing Rhythms.") The basic equation is to find the difference between each element of the sample vector and each element of every database vector. We need to normalize this difference, however, which can be done in two different ways.

For databases in which each element of the vector contains an approximately normal distribution of values, we can compute the standard deviation (sd[i]) of each element for all entries in the database. The standard deviation for each feature vector element, i, is computed as:

$$sd[i] = \sqrt{(\Sigma(A_j[i]-\mu)^2)/M}; \text{ for } j=0 \text{ to } M-1$$

where M is the number of records in the database and $\mu$ is the average value of the element.

For databases in which some elements of the feature vector have a non-normal distribution, we can compute the normalization factor as the range for each element across database entries. The range (r) for an element is computed as the maximum value of an element minus the minimum value across all database entries. The selection of which normalization factor to use (sd or r) can be left up to the user or can be chosen by the database system based on an analysis of how "normal" the distribution of values for each element in the feature vector is across all database entries.

Once the normalization value for each element has been computed (using either the standard deviation or range methods just described) then it is stored in the normalization vector, V. We then use a simple Euclidean distance measure to find the distance of each database vector from the sample vector. This distance of the sample vector, A, to an individual database record, B, is computed as $$distance = \sqrt{\Sigma((A[i]-B[i])/V[i])^2}; \text{ for } i=0 \text{ to } N-1$$

where N is the number of elements in the feature vector.

Once the distance is computed between the sample sound, A and each database record, then the records can be sorted by distance to create an ordered list of the most similar sounds in the database to the sample sound.

It should be noted that we can easily remove certain elements of the feature vector and do the same comparison. For example, it might be useful to ignore the length of the sound file when comparing two sounds, or perhaps the pitch could be ignore for sounds which are not monophonic. In this case, the elements are just not used in the vector computation (that is the specific values of i corresponding to these elements are not included).

Although the bass parameters statistics are stored in the main feature vector, normally these statistics are ignored when doing comparisons of sounds. Their chief use is in generating the rhythm feature vector, which is used as described under "Comparing Rhythms."

Also, we could add a weighted distance measure that would allow a certain percentage of each element of the feature vector to be used in computation. For example, one might weight the length of the sound file element at zero to ignore it, but weight the average pitch at 0.5 to consider pitch to be half as important to the distance measure as the other elements (which are assumed to have a weighting of 1.0). In this case, the distance equation would be:

$$distance = \sqrt{\Sigma(((A[i]-B[i]) \cdot W[i])/V[i])^2}; \text{ for } i=0 \text{ to } N-1$$

where N is the number of elements in the feature vector, and W is the weight vector containing the multiplication factor for weighting each element in the computation.

Figure 17:
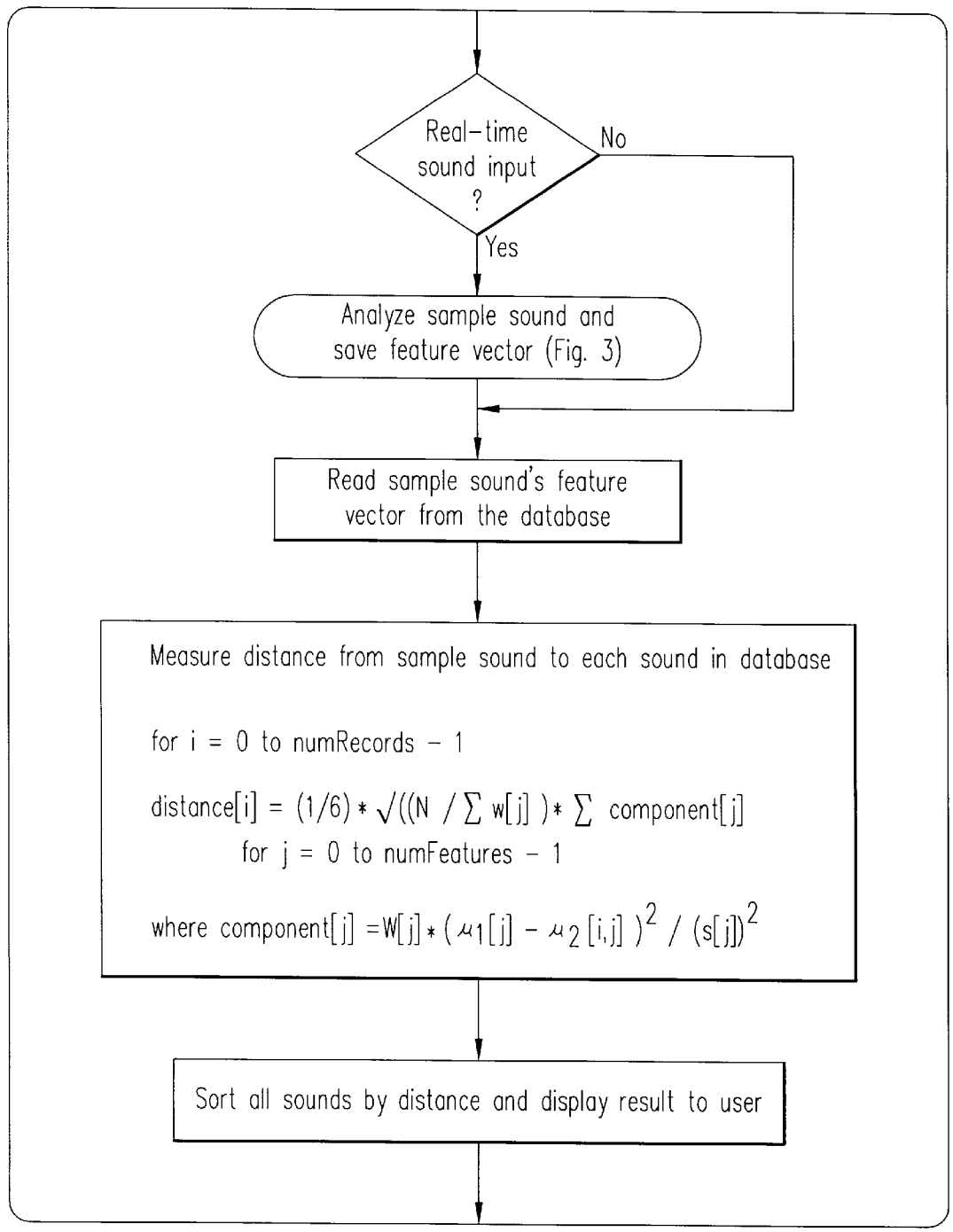
FIG. 17 is a Flow Diagram showing Sound Comparison Method in accordance with one embodiment of the invention.
Figure 18:
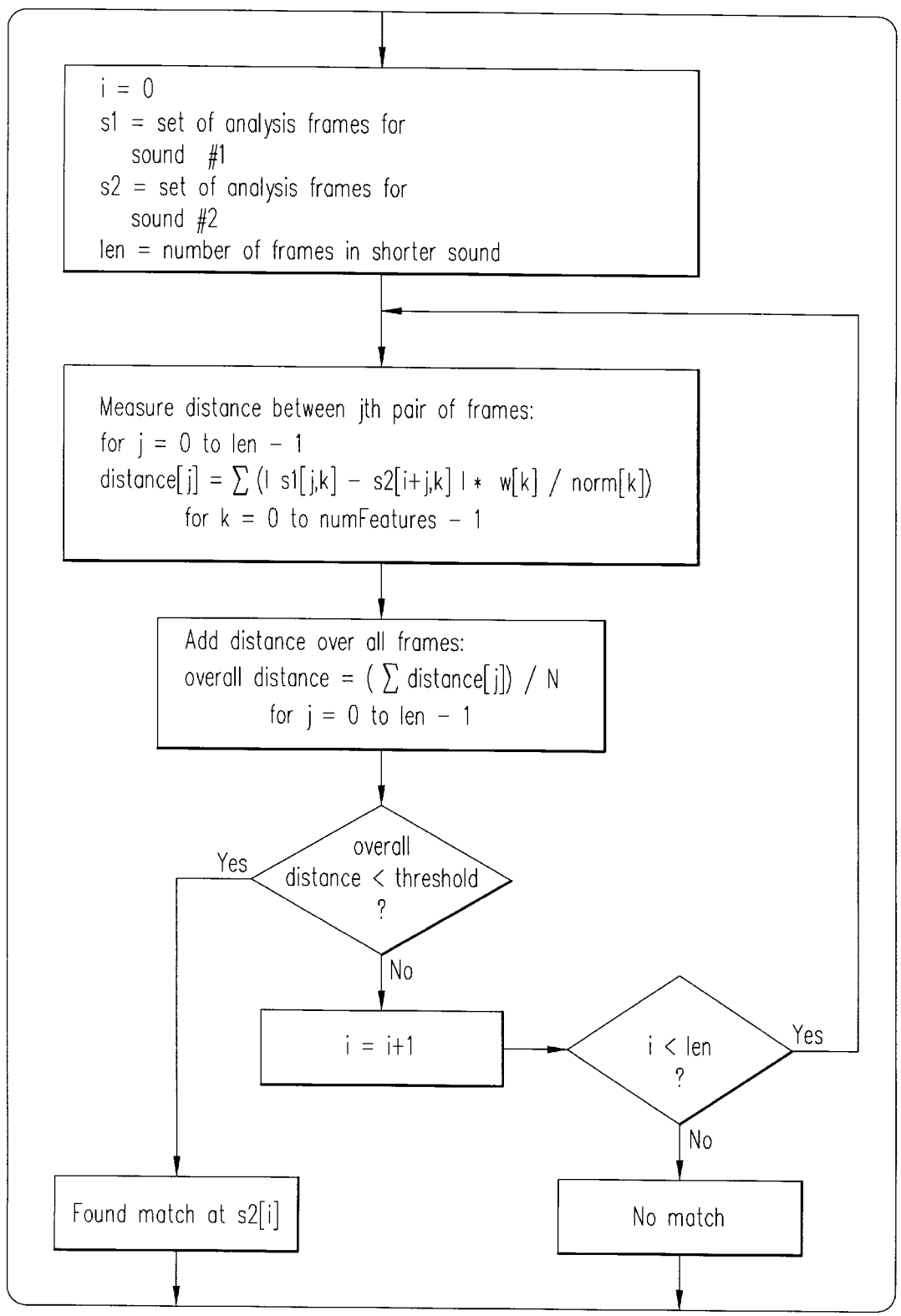
FIG. 18 is a Flow Diagram showing Trajectory Matching Method in accordance with one embodiment of the invention.
Figure 19:
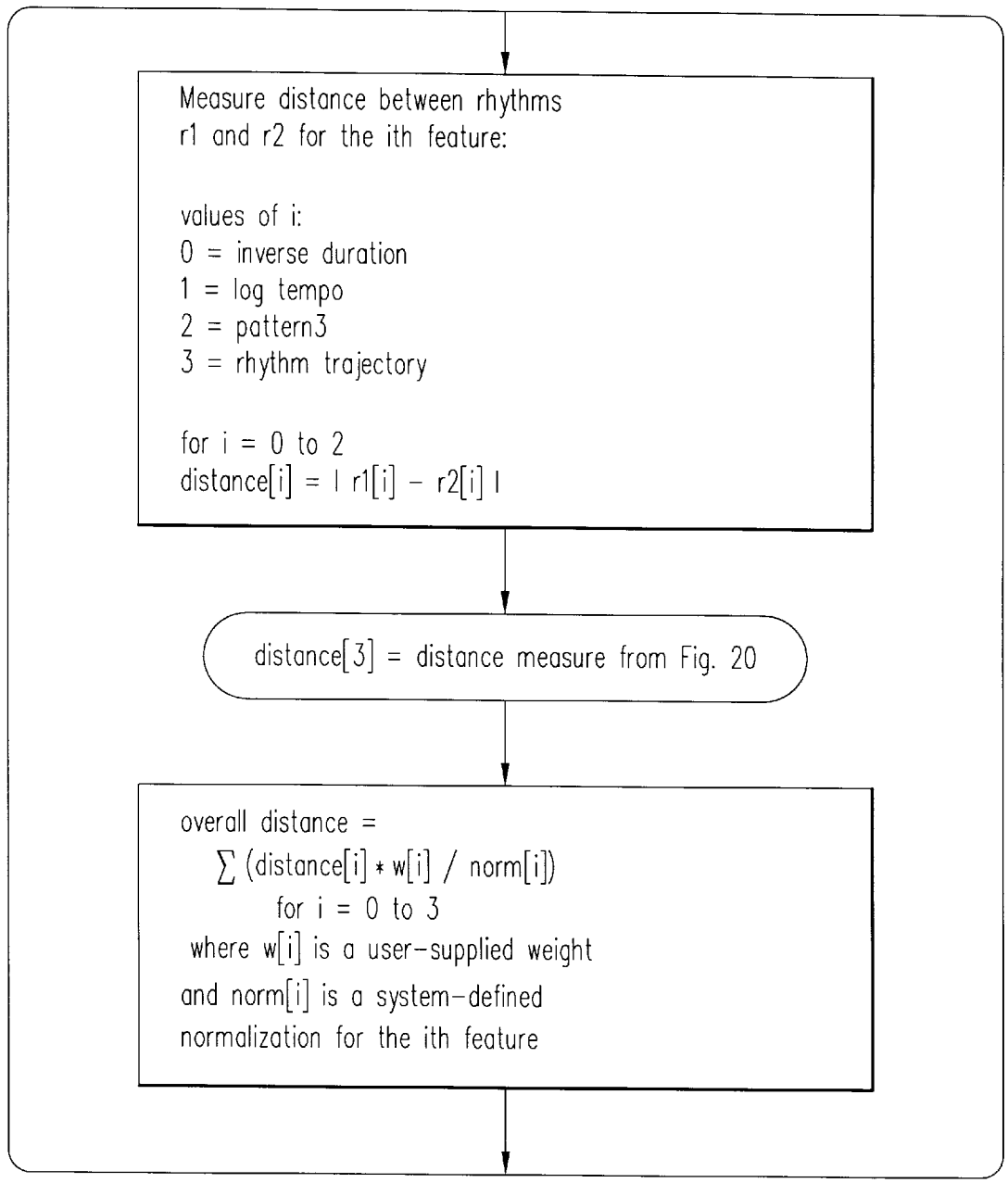
FIG. 19 is a Flow Diagram showing Rhythm Comparison Method in accordance with one embodiment of the invention.
Figure 20:
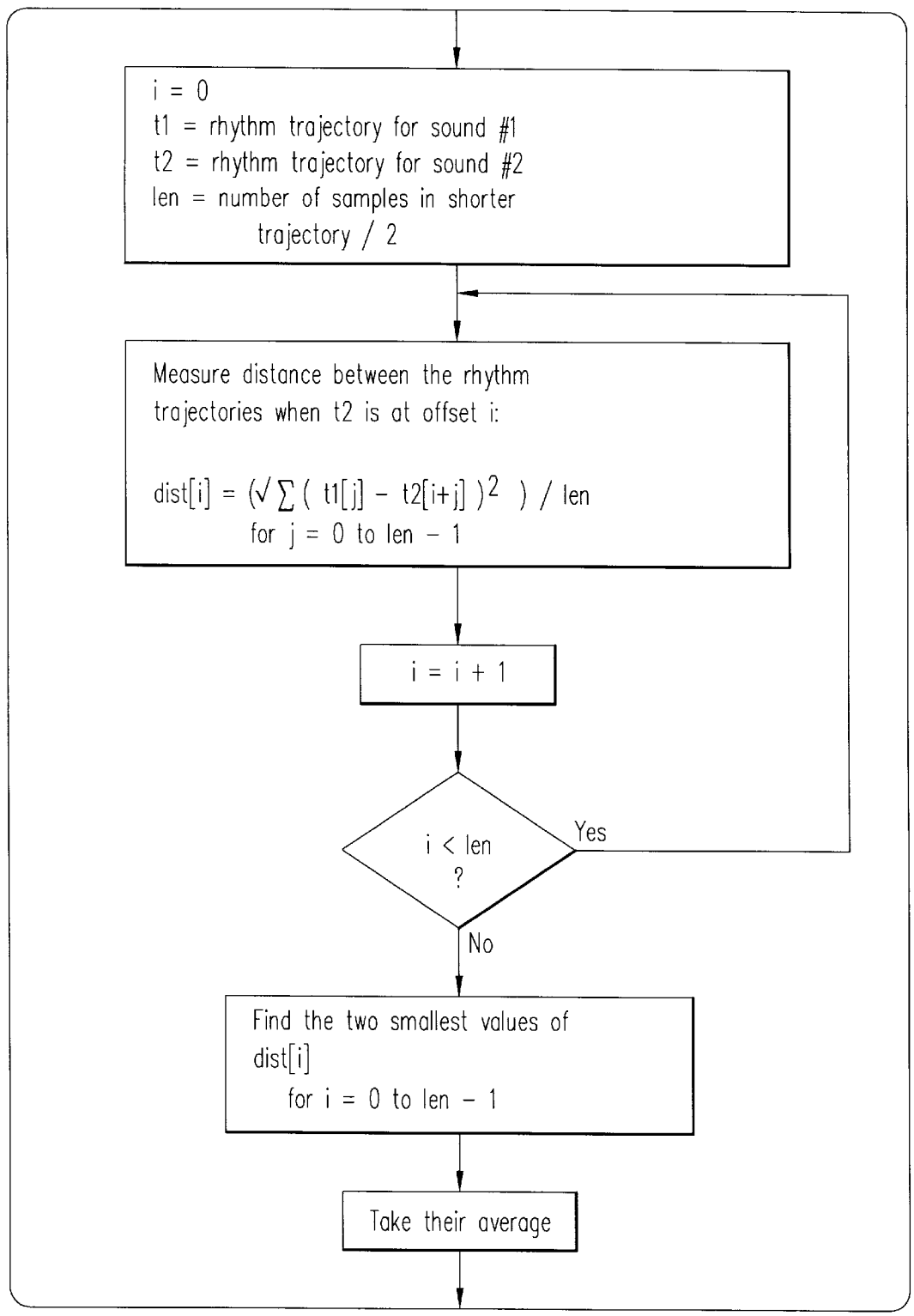
FIG. 20 is a Flow Diagram showing Method of Computing Distance between Rhythm Trajectories in accordance with one embodiment of the invention.

The invention also provides another method for measuring the distance between any two sounds (FIG. 17). This other approach is to use the standard deviations stored in the feature vectors themselves as the normalization, instead of using the standard deviations (or the ranges) over all sounds in the database. With this technique, there are two ways of computing the standard deviation and thus the distance: an asymmetric case and a symmetric case.

In the following discussion, the term "trajectory" includes not only the basic acoustical analysis attributes (loudness, pitch, brightness, bandwidth, and MFCCs), but also their first derivatives.

The two cases differ in their choice of which of the two sounds' feature vectors to use. In the asymmetric case, only sound #1's feature vector is used. The standard deviation of each trajectory stored in the feature vector is used as the standard deviation for the distance computation.

That is, s[i]=s1[i], for i=0 to N−1, where N is the number of trajectories whose standard deviations are stored in the feature vector, s1[i] is sound #1's array of standard deviations, and s[i] is the array of standard deviations to be used in the distance computation. Note that this case is asymmetric, because different values of the distance are usually obtained depending on which of the two sounds is considered to be sound #1.

In the symmetric case, both sounds' standard deviation arrays contribute to the distance computation. The symmetry implies that the distance from sound #1 to sound #2 must also be the distance from sound #2 to sound #1.

In this case, $$s[i]=\sqrt{((a \cdot b)/(a+b))}, \text{ where } a=(s1[i])^2 \text{ and } b=(s2[i])^2.$$

With both the symmetric and the asymmetric cases, we start the distance calculation by computing a component contributed by each trajectory:

$$component[i]=W[i] \cdot (\mu 1[i]-\mu 2[i])^2/(s[i])^2$$

where $W[i]$ is the user- (or software-) supplied weight for the ith trajectory, m1 is the average of the ith trajectory, as stored in the feature vector for sound #1, and m2[i] is the corresponding average for sound #2.

The actual contribution of the trajectory to the distance of sound #1 from sound #2 is given by:

$$(\frac{1}{6}) \cdot \sqrt{((a \cdot b)/component[i])}$$

The total distance of sound #1 from sound #2 is given by:

$$distance=(\frac{1}{6}) \cdot \sqrt{((N/S\ W[i]) \cdot \Sigma component[i])} \text{ for } i=0 \text{ to } N\ B\ 1$$

The asymmetric case is generally chosen when comparing a set of sounds to a sample sound chosen by the user. The symmetric case is chosen when comparing two sounds where neither has priority. One example of the symmetric case is segmenting a sound based on scene changes, as described later under "Segmenting Sounds."

FIG. 18: COMPARING TRAJECTORIES

In some applications, the user might want to retrieve sounds that match a given sound almost exactly. A more exact and detailed match is possible by looking at the trajectories frame by frame, instead of comparing their statistics as above. This approach requires that the entire trajectories be stored, not just their means and standard deviations. Trajectory comparison is accomplished by summing the weighted differences between sound #1's and sound #2's values of each acoustic attribute, as follows.

The distance between the ith frame of sound #1 and the corresponding frame of sound #2 is given by:

$$distance[i]=\Sigma(val1[ij]-val2[ij] \cdot w[j]/norm[j])$$

for j from 0 to numAttr-1,
where numAttr is the number of acoustic attributes; namely, 4 plus the number of MFCC coefficients (plus 1 if the bass option is used);
val1[i,j] is the value of the jth acoustic attribute for the ith frame of sound #1, and val2[i,j] is the corresponding value for sound #2;
w[j] is a user-supplied weight (which defaults to 1.0) specifying how much importance to give to the jth acoustic attribute when computing the distance;
and norm[j] is a system-defined normalization factor for the jth acoustic attribute, which converts the units exposed to the user into the range from 0.0 to 1.0.

The overall distance between the two sounds is the average of the distances between each pair of frames, namely:

$$overallDistance=(\Sigma distance[i])/N$$

for i from 0 to N-1,
where N=the number of frames.

The above distance measures assume that the two sounds have equal duration (an equal number of analysis frames). If this is not the case, the comparison is made only over the frame numbers that the two sounds have in common, and an optional penalty can be applied. The penalty increases the distance between the two sounds, by multiplying the normally computed overall distance by the ratio of the longer trajectory's duration to the shorter one's.

The above discussion has also presented the comparison as though the two sounds' trajectories must start at the same point in time—in other words, as though frame[i] of sound #1 must correspond to frame[i] of sound #2.

This is overly restrictive, since two sounds might match very closely, but one might start out with an extra bit of sound data, say, a fraction of a second long. Also, when the application is segmentation, or when a real-time input stream is being searched, one is searching for a shorter sound within a longer sound, so the starting point of the match is not known a priori. For these reasons, trajectory matching is actually done by stepping through the target sound one analysis frame at a time, and performing the above comparison at each step, using the current frame of the target sound as though it were the first frame of sound #2 in the above comparison. Thus a successively larger offset is added to the beginning of the target sound, until a match is found or until the end of one of the sounds is reached. The definition of "a match is found" is that the distance between the sound #1 and sound #2 (where sound #2 is a subset of the target sound) falls below a threshold, indicating that the two sounds' trajectories are sufficiently similar. The threshold can be specified by the user but defaults to 1.0.

FIG. 19: COMPARING RHYTHMS

Preceding sections explained comparisons using the main feature vector, which stores statistical measures, as well as comparisons using the frame-by-frame trajectories. For musical applications, there is also an option to compare sounds using their rhythm feature vectors. This can be done as a supplement to the comparison using the main feature vector. In the following discussion, we say A two rhythms as a shortcut for the rhythm feature vectors of two sounds.

The overall distance between two rhythms is computed as a weighted average of their distances for each feature in the rhythm feature vector. For example, if rhythm #1 has a log tempo of 6.5, and rhythm #2 has a log tempo of 7.0, the absolute value of the difference between the two log tempos is taken (0.5). This difference is multiplied by the user-supplied weight, if any, that specifies how much importance to place upon tempo when comparing two rhythms. (The weight is normalized to convert its units into the range from 0 to 1).

The rhythm features used in comparing rhythms are inverse duration, log tempo, pattern, and the rhythm trajectory. All but the last of these are straightforward and are computed as was described for log tempo in the previous paragraph.

As explained earlier, rhythm trajectories are always normalized in time so that their sampling rates are all ⅙ beat, allowing rhythms with different tempos to be meaningfully compared. However, there are still some other problems to be solved in comparing two rhythm trajectories. What if one trajectory is longer than the other? That situation is likely when the two musical passages contain a different number of measures or are in different meters. For purposes of comparison, we simply truncate the longer rhythm trajectory to the length of the shorter one.

Another problem is that the rhythm trajectories might be offset from each other. For example, they might be identical except that one starts with an upbeat while the other starts on the downbeat. To detect such cases, we step through one of the rhythm trajectories one sample at a time (FIG. 21), measuring the distance from the array that starts at that sample to the array that starts the first sample of the other rhythm trajectory. At each step, the distance between the two arrays is computed as:

$$trajDistance[i] = (\cdot \Sigma (r1[j] - r2[i+j])^2)/N$$

for j from 0 to N−1, where i is the current sample number in the trajectory we're stepping through, r1 and r2 are the two rhythm trajectories, and N=half the length of the shorter of the two rhythm trajectories.

We stop stepping when i=N−1. We then find the two offsets with the bestmatch. In other words, for i from 0 to N−1, we find the two smallest values of trajDistance[i]. We average these two distances. The result is the contribution of the rhythm trajectory, which is just one feature of the rhythm feature vector, to the overall rhythm distance.

The overall distance between two rhythms is:

$$total\ distance = \Sigma(distance[i]/W[i])$$

for i from 0 to the number of rhythm features minus 1, where distance[i] is the distance for the ith rhythm feature and W[i] is the normalization factor for the ith rhythm feature.

CLASSIFYING SOUNDS BY USING STATISTICAL MEASURES

It is also possible to train the system to recognize certain properties of sound, referred to as categories. In this case, the user selects samples of sounds that demonstrate the property the user wishes to train, e.g., "laughter". Each of the sample sounds are then used to compute an average vector for the set, $\mu$, and a normalization vector for the set, V. (The normalization values are either the standard deviation or the range values, as described in the previous section.) These vectors can be stored in a separate database which defines categories.

Once categories have been defined by providing sets of vectors which have a large degree of the property being defined, then we can compare individual sounds with the categories and come up with a distance measure between a sound and a category. In this case the distance calculation is similar to that used when comparing two individual sound files, described in the previous section. This distance of the example vector, A, to a category, as defined by $\mu$ and V is given by:

$$distance = \sqrt{\Sigma((A[i] - u[i])/V[i])^2};\ for\ i=0\ to\ N-1$$

The distance can compared to some threshold value to determine whether the sound is "in" or "out" of the class. The simplest way to set the threshold value is to set it to the maximum distance between any member of the class and the class mean, maxClassDistance. In this case, any new sample that has a distance from the class of less than maxClassDistance, would be considered to be "in" the category.

If it is known a priori that some acoustic features are unimportant for the class, these can be ignored or given a lower weight in the computation of distance. For example, if the class models some tambrel aspect of the sounds, the duration and average pitch of the sounds can usually be ignored.

CLASSIFYING SOUNDS BY USING A DECISION TREE

There are two situations where the above classification techniques break down. One case is where the user is trying to describe very broad classes, such as "music" or "speech." In this case, the standard deviations are so large that the discrimination between sounds inside and outside of the class will be poor. The other case is where the user is trying to discriminate between very similar classes, such as the difference in sound between two male speakers. In this case, the differences are generally more subtle than can be captured by the mean and standard deviation model.

For these situations, we use a more sophisticated discriminator, which functions as follows.

For each class of sound, sound examples are collected. These are run through our preliminary audio analysis, producing a set of values for loudness, pitch, brightness, bandwidth, and MFCC for each frame of each sound. All these frames are collected together into sets, one set for each class of sound. (Within a set, the order of the frames and of the sounds is unimportant, as is the number of sounds; only the statistical distribution of the frame values is important.)

Training:

These sets are then supplied to a training algorithm based on splitting. Such splitting techniques are common in speech research, although there is one feature unique to our approach.

The training algorithm produces a decision tree that partitions the feature space into regions that best discriminate between the various classes. Each dimension of the feature space represents one of the acoustical features (pitch, loudness, etc.), and each data point in the space represents one analysis frame. The algorithm "knows" which set (that is, which class of sound) each point came from. For each point, and for each dimension of the feature space, a hyperplane is drawn perpendicular to the dimension at the value of that point along the dimension. This divides the feature space into two pieces. A quality computation (unique to our invention and described in more detail below) is done which measures how well that partition separates points from the different classes. The point/dimension combination whose quality measure is the highest is remembered. This is the first split of the feature space.

For each of the two halves of the feature space, the splitting algorithm is applied recursively, building a binary tree of split points. The process ends when the number of points in a region from each of the classes, except one, falls below a threshold. At this point, the region contains the points of essentially one class. The threshold is greater than zero and is set high enough to ignore statistical outliers in the splitting process.

When this condition is met, this node of the decision tree is labeled a leaf and given a unique leaf index. We keep track of these leaves, their index numbers, and how many points from each class are in each leaf.

When the process finishes, we have a set of vectors, one for each class of sound. The nth element of the vector for a particular class of sound contains the number of points from that class in the nth leaf divided by the total number of points in that class. Thus it is a measure of how densely that class populates all the leaves of the decision tree. How distinct these vectors are from each other is a measure of how well the sound classes can be distinguished.

Separation Quality Measure:

We start with a region of the feature space, the points from all the classes in this region, and a split (dimension and value) whose quality is to be measured. For each class's set of points in the region, we compute the ratio of those whose values in the split dimension are above the split value to their total number. Call this value ratio[n] for the nth class.

For the nth class, we compute a quality factor which measures how well this class is separated from all the other classes:

$$\text{ratioSum} = \text{sum over } (i! = n) \text{ of } (\text{ratio}[i])$$

$$\text{classQuality} = MAX((\text{ratio}[n] + (1.0 - \text{ratioSum})), (\text{ratioSum} + (1.0 - \text{ratio}[n])))$$

where MAX(x, y) means the maximum of the values x or y.

The total quality measure is the sum of all the classQuality measures.

Classification:

Given a target segment of sound, we can use the decision tree above to classify the sound. The sound segment is run through the preliminary audio analysis, producing a set of frame data points. Each point is used to traverse the decision tree and will end up in one of the leaves. The total number of points from the segment's data set in each leaf is put into a vector sorted by leaf index as before.

This vector is then compared to the vectors for each class derived in the training process above using the correlation distance:

$$\text{distance} = (\text{sum over } i=1 \text{ to } n\text{Classes of } (\text{targetVector}[i] * \text{classVector}[i]))/(\text{sum over } i=1 \text{ to } n\text{Classes of } (\text{targetVector}[i] * \text{targetVector}[i]))$$

The class which has the smallest distance to the target is the class assigned to the target.

SEGMENTING SOUNDS

The feature vector constitutes a compact representation of a sound. It can represent sound files of any length, without any corresponding increase in the feature vector's size. However, the feature vector is most appropriate for shorter sound files containing a single sort of sound whose sonic quality is fairly homogeneous over the course of the sound file. For example, a recording of a person talking can be fairly homogeneous. As a contrasting example, a recording of a radio news broadcast typically has abrupt sonic changes, switching from the voice of an anchor person to background noise in the scene where a reporter is on location, and later witching to the music of a commercial. In these longer recordings, the sonic quality changes drastically over time, because the recording is a sequence of different sounds.

The invention allows such composite sounds to be represented as a series of segments. Each segment is represented by its own feature vector, which contains the analysis results for the corresponding temporal portion of the sound file. The data structure that represents the segment also includes two time tags, one specifying the time at which the segment begins and the other the time at which it ends. In musical applications, the data structure also includes the rhythm feature vector.

The question arises as to how to automatically divide one of these longer recordings (or a real-time stream of sound) into its discrete segments. A trivial method of segmentation is to divide the sound into sections of predetermined length, paying no attention to the content of the sound.

Another simple method is to break the sound at points of silence (or, more generally, at points where the volume drops below some threshold). However, the invention allows more sophisticated segmentation, using the content-based analysis, comparison, and retrieval techniques described in the preceding sections. Those techniques were described as pertaining to entire sound files (or isolated real-time sounds). However, those skilled in the art will recognize that the same techniques can be applied to the problem of finding sound events within a longer sound file or within a real-time stream of digital audio. This task of locating a sound within a longer sound is closely akin to the task of segmenting the longer sound.

When segmenting a stream or a recording (hereafter referred to generally as a stream), the first step is to analyze the stream, using the analysis technique previously described. During the analysis, the stream is temporarily considered to consist of a sequence of segments of fixed duration. The analysis technique characterizes each of the segments with a feature vector, as though it were a discrete sound file.

The invention provides three methods of segmentation: by similarity, match, and scene change.

1. Segmentation by similarity

With this segmentation method, the user (or an automated software routine) supplies a sound and asks the system to mark the points in the stream at which the stream starts or stops sounding similar to the supplied sound. These points will delineate the boundaries of the segments created by the new segmentation.

The supplied sound is represented by a feature vector containing the statistical results of the analysis techniques described above. The user can specify a threshold that specifies how similar a region in the stream must be to the supplied sound. Adjacent regions whose similarity to the supplied sound is above this threshold will be identified as being part of a single segment. Similarly, adjacent regions whose similarity is below the threshold will be considered a single segment. The user can also specify the duration of the regions to be considered. Typically a region's duration is in the range from 1 to 30 seconds. The "hopsize," which determines the amount of overlap between neighboring regions, can also be specified.

After receiving the supplied sound, and optionally the threshold and region duration, the method then steps through the stream, comparing each region with the supplied sound, using the comparison technique described earlier. When the first region is encountered whose similarity exceeds the threshold, it is marked as a segment boundary. Similarly, when the next region is encountered whose similarity drops below the threshold, it too is marked as a boundary. The stream is thus divided into segments that are alternately similar and dissimilar to the supplied sound.

2. Segmentation by match

With the second segmentation method, the user again supplies a sound, but in this case the user is searching only for an exact match to the sound. Again, the user can give a threshold that specifies how exact the match must be. What is different from the first method is that the supplied sound is characterized not by the statistics stored in a feature vector, but by the actual analysis frames themselves. That is, instead of using the means and standard deviations of the trajectories, as well as of the first derivatives of the trajectories, the method uses the trajectories themselves—loudness, bass, pitch, brightness, bandwidth, and MFCCs. This method lets the user compare the actual shapes of the trajectories, unlike statistics, which don't preserve much information about the time-varying nature of a trajectory. The method compares the supplied sound's trajectories with trajectories of equal length starting from successive frames of the stream. This method steps through the stream frame by frame rather than region by region. When it finds a matching trajectory in the stream, it marks the beginning and ending of the trajectory as segment boundaries.

3. Segmentation by scene change

The third segmentation method segments the stream by finding "scene changes": points at which successive regions are sufficiently dissimilar from each other. In this case, the user does not supply a sound. Instead, the similarity comparisons are done on neighboring regions, using the comparison techniques described previously.

When a region is encountered whose similarity to the previous region drops below the threshold, it is marked as a segment boundary. Thus, the stream is segmented into dissimilar regions. Unlike the first and second methods, which in effect place each region into one of two categories—similar or dissimilar to a supplied sound—this method can in effect create many different categories. This segmentation method itself does not compare non-adjacent segments to see whether they might be similar, but if desired such a comparison can be done after segmentation, exactly as with any arbitrary set of sound files.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for analyzing sound files for one or more of storing, comparing, and retrieving audio data, comprising the steps of:
   (a) measuring a plurality of acoustical features of a sound file chosen from the group consisting of at least one of loudness, pitch, brightness, bandwidth, and MFCC coefficients thereof;
   (b) computing measurements chosen from the group consisting of mean, standard deviation, autocorrelation and first derivative thereof, of the acoustical features of the audio files, forming a vector of the feature and measurements data, and storing the computed measurements and vector in a feature file with a linkage to the sound file; and
   (c) grouping the feature files based on at least one of (i) similar measurements for the feature files, and (ii) distance between the vector for a sound file and a vector for a reference, to facilitate rapid classification, storage, and/or retrieval of sound files based on a predefined search criteria.

2. The method as recited in claim 1, wherein the predefined search criteria is based on the feature file of a particular audio file.

3. The method as recited in claim 1, wherein the predefined search criteria are similar to a user created sound.

4. The method as recited in claim 1, wherein the predefined search criteria are characteristics of a predefined set of example audio files.

5. The method as recited in claim 1, wherein the acoustical feature is a set of Mel-frequency cepstral coefficients (MFCCs).

6. The method as recited in claim 1, wherein the statistical measurement is the average value of the first derivative of each acoustical feature.

7. The method as recited in claim 1, wherein the statistical measurement is the standard deviation of the first derivative of each acoustical feature.

8. A computer program embodied on a computer-readable medium for analyzing audio files, comprising:
   (a) a code segment for measuring a plurality of acoustical features of a sound file chosen from the group consisting of at least one of loudness, pitch, brightness, bandwidth, and MFCC coefficients thereof;
   (b) a code segment for computing measurements chosen from the group consisting of mean, standard deviation, autocorrelation and first derivative thereof, of the acoustical features of the audio files, forming a vector of the feature and measurements data, and storing the computed measurements and vector in a feature file with a linkage to the audio file; and (c) a code segment for grouping the feature files based on at least one of (i) similar measurements for the feature files, and (ii) distance between the vector for a sound file and a vector for a reference, to facilitate rapid classification, storage, and/or retrieval of sound files based on a predefined search criteria.

9. The computer program embodied on a computer-readable medium for analyzing sound files as recited in claim 8, wherein the predefined search criteria is based on the feature file of a particular audio file.

10. The computer program embodied on a computer-readable medium for analyzing sound files as recited in claim 8, wherein the predefined search criteria is similarity to a user-created created sound.

11. The computer program embodied on a computer-readable medium for analyzing sound files as recited in claim 8, wherein the predefined search criteria are characteristics of a predefined set of example audio files.

12. A content based comparison method for segmenting sound files, comprising the steps of:

(a) measuring a plurality of acoustical features of an sound file chosen from the group consisting of at least one of loudness, pitch, brightness, bandwidth, and MFCC coefficients thereof;

(b) computing measurements chosen from the group consisting of mean, standard deviation, autocorrelation and first derivative thereof, of the acoustical features of the audio files, forming a vector of the feature and measurements data, and storing the computed measurements and vector in a feature file with a linkage to the audio file; and (c) segmenting the feature files based on at least one (i) similar measurements for the feature files, and (ii) distance between the vector for a sound file and a vector for a reference, to facilitate rapid classification, storage, and/or retrieval of sound files based on a predefined search criteria.

13. The method as recited in claim 12, wherein the content-based comparison compares a user-supplied sound to successive regions of the sound that is to be segmented to measure the similarity between the measurements of the two sounds' acoustical features.

14. The method as recited in claim 12, wherein the content-based comparison compares a user-supplied sound to successive regions of the sound that is to be segmented, measuring the frame-by-frame similarity between the two sounds' acoustical features.

15. The method as recited in claim 12, wherein the content-based comparison compares adjacent regions of the sound that is to be segmented, measuring the similarity between the regions' statistical measurements.

16. A computer program embodied on a computer-readable medium for segmenting sound files by using content-based statistical comparison of a plurality of acoustical features of a sound file chosen from the group consisting of at least one of loudness, pitch, brightness, bandwidth, and MFCC coefficients thereof to determine the segment boundaries.

17. A computer program according to claim 16 in which the sound files include a segment of digital audio on a storage device.

18. The computer program embodied on a computer-readable medium for segmenting sound files as recited in claim 16, wherein the content-based comparison compares a user-supplied sound to successive regions of the sound that is to be segmented, measuring the similarity between the statistical measurements of the two sounds' acoustical features.

19. The computer program embodied on a computer-readable medium for segmenting sound files as recited in claim 16, wherein the content-based comparison compares a user-supplied sound to successive regions of the sound that is to be segmented, measuring the frame-by-frame similarity between the two sounds' acoustical features.

20. The computer program embodied on a computer-readable medium for segmenting audio files as recited in claim 16, wherein the content-based comparison compares adjacent regions of the sound that is to be segmented, measuring the similarity between the regions' statistical measurements.

* * * * *

UNITED STATES PATENT AND TRADEMARK OFFICE
CERTIFICATE OF CORRECTION

PATENT NO. : 5,918,223
DATED : June 29, 1999
INVENTOR(S) : Blum, et. al.

It is certified that error appears in the above-indentified patent and that said Letters Patent is hereby corrected as shown below:

Title page, item [63] Related U.S. Application Data, "Jul. 19" should read --Jul. 22--.

Signed and Sealed this

Tenth Day of April, 2001

Attest:

NICHOLAS P. GODICI

Attesting Officer

Acting Director of the United States Patent and Trademark Office